United States Patent
Yasui et al.

(10) Patent No.: US 8,000,861 B2
(45) Date of Patent: Aug. 16, 2011

(54) BRAKING CONTROL APPARATUS FOR VEHICLE

(75) Inventors: Yoshiyuki Yasui, Nagoya (JP); Yasuo Takahara, Anjo (JP); Takashi Sato, Okazaki (JP); Kazuya Maki, Nagoya (JP)

(73) Assignee: Advics Co., Ltd., Kariya, Aichi-Pref. (JP)

( * ) Notice: Subject to any disclaimer, the term of this patent is extended or adjusted under 35 U.S.C. 154(b) by 596 days.

(21) Appl. No.: 12/099,418

(22) Filed: Apr. 8, 2008

(65) Prior Publication Data
US 2008/0255732 A1 Oct. 16, 2008

(30) Foreign Application Priority Data

Apr. 13, 2007 (JP) ................................. 2007-106133
Feb. 6, 2008 (JP) ................................. 2008-025847

(51) Int. Cl.
*G05D 3/00* (2006.01)
(52) U.S. Cl. ........................................................ 701/48
(58) Field of Classification Search .................... 701/48, 701/53–54, 70; 477/182, 202; 303/10–12, 303/155, 157
See application file for complete search history.

(56) References Cited

U.S. PATENT DOCUMENTS

| | | | |
|---|---|---|---|
| 5,842,751 A | 12/1998 | Unterforsthuber | |
| 6,024,420 A | 2/2000 | Yonemura et al. | |
| 6,434,933 B1 * | 8/2002 | Oishi et al. | 60/547.1 |
| 2001/0003402 A1 * | 6/2001 | Isono et al. | 303/155 |

FOREIGN PATENT DOCUMENTS

| | | |
|---|---|---|
| JP | 9-030385 A | 2/1997 |
| JP | 9-323641 A | 12/1997 |

* cited by examiner

*Primary Examiner* — Kim T Nguyen
(74) *Attorney, Agent, or Firm* — Buchanan Ingersoll & Rooney PC

(57) ABSTRACT

A braking control apparatus for a vehicle includes four wheel braking apparatuses for applying a braking torque to wheels, a first hydraulic pressure generating apparatus generating a hydraulic pressure, a vacuum booster generating an assist force for assisting a breaking operation, a first hydraulic circuit, a second hydraulic circuit, a second hydraulic pressure generating apparatus generating an assist hydraulic pressure that is added to the hydraulic pressure, a detecting portion for detecting a braking operation variable, a target value determining portion for determining a first assist hydraulic pressure target value and a second assist hydraulic pressure target value to be both greater than zero over a range where the braking operation variable is greater than a predetermined value at which the assist force by the vacuum booster is started, and a pressure regulating portion for regulating the assist hydraulic pressure to mach the assist hydraulic pressure target value.

10 Claims, 13 Drawing Sheets

Braking operation variable Bs

Operation force F

BRAKING CONTROL APPARATUS FOR VEHICLE

CROSS REFERENCE TO RELATED APPLICATIONS

This application is based on and claims priority under 35 U.S.C. §119 to Japanese Patent Application No. 2007-101633 filed on Apr. 13, 2007 and No. 2008-025847 filed on Feb. 6, 2008, the entire contents of which are incorporated herein by reference.

FIELD OF THE INVENTION

This invention generally relates to a braking control apparatus for a vehicle.

BACKGROUND

A vacuum booster is widely known to generate an assist force for assisting a braking operation force produced by a driver and applied to a master cylinder. By using a pressure lower than an atmospheric pressure (hereinafter referred to as a "negative pressure") such as a manifold air pressure of an internal combustion engine, the braking operation by the driver is assisted according to the known vacuum booster. Such assist will be hereinafter referred to as a "vacuum assist".

In addition, a brake hydraulic pressure control apparatus is widely known to have a hydraulic pump for generating an assist hydraulic pressure added to a hydraulic pressure generated by the master cylinder, and a solenoid valve for adjusting and controlling the assist hydraulic pressure. By using the assist hydraulic pressure, the braking operation by the driver is assisted according to the known brake hydraulic pressure control apparatus. Such assist will be hereinafter referred to as a "pump assist".

JP9030385A and JP9323641A disclose apparatuses each assisting a braking operation performed by the driver by means of the pump assist in addition to the vacuum assist. Such apparatuses will be explained with reference to FIG. 21.

FIG. 21 is a graph illustrating characteristics of a braking pressure (i.e., wheel cylinder pressure) relative to a braking operation force F produced by the driver. In FIG. 21, a characteristic line Ch1 shows characteristics in cases where neither the vacuum assist nor the pump assist is performed. A characteristic line Ch2 shows characteristics in cases where only the vacuum assist is performed. A change point (i.e., vacuum assist limit point) on the characteristic line Ch2 is a point where an application of the braking pressure by the vacuum assist reaches a limit value (i.e., maximum value).

A characteristic line Ch3 shows characteristics according to the apparatus disclosed in JP9030385A. As illustrated by the characteristic line Ch3, only the vacuum assist is performed until the braking operation force F reaches a value FB0 that corresponds to the change point (F≦FB0). In cases where the braking operation force F reaches the value FB0, the pump assist is then started. Accordingly, the decrease in a rising gradient of the braking pressure relative to the increase in the braking operation force F within an area where the braking operation force F exceeds the value FB0 can be compensated.

A characteristic line Ch4 shows characteristics according to the apparatus disclosed in JP9323641A. As illustrated by the characteristic line Ch4, only the vacuum assist is generally performed. In cases where a deceleration speed of a wheel exceeds a predetermined value because of a sudden braking, and the like, the pump assist is started and performed relative to the braking operation force F at that time (=value F1). Accordingly, a vehicle can be securely rapidly accelerated at a time of the sudden braking, and the like.

The pump assist is achieved by a hydraulic pressure control based on an electronic control of a motor for driving a hydraulic pump, a solenoid valve, and the like. On the other hand, the vacuum assist is achieved by only a mechanical structure of the vacuum booster, without the use of the electronic control. Thus, dynamic characteristics in application of the braking pressure between the pump assist and the vacuum assist relative to the braking operation force F are inevitably different because of a difference in operating principles between the pump assist and the vacuum assist.

Accordingly, when the pump assist is started during the braking operation during which only the vacuum assist is performed, the driver may tend to have an uncomfortable feeling in a brake operation. Such tendency is most pronounced in cases where the pump assist is started at a time when the braking operation force F becomes sufficiently large (i.e., at a time when the vacuum assist is sufficiently large) as in the apparatuses disclosed in JP9030385A and JP9323641A.

A need thus exists for a braking control apparatus for a vehicle which is not susceptible to the drawback mentioned above.

SUMMARY OF THE INVENTION

According to an aspect of the present invention, a braking control apparatus for a vehicle includes four wheel braking apparatuses for applying a braking torque to front-right, front-left, rear-right, and rear-left wheels in response to a braking hydraulic pressure supplied to wheel cylinders provided at the respective wheels, a first hydraulic pressure generating apparatus including two hydraulic pressure generating chambers each generating a hydraulic pressure in response to a braking operation by a driver of a vehicle, a vacuum booster generating an assist force for assisting a breaking operation performed by the driver relative to the first hydraulic pressure generating apparatus, a first hydraulic circuit hydraulically connecting one of the hydraulic pressure generating chambers to the two of the wheel braking apparatuses, a second hydraulic circuit hydraulically connecting the other one of the hydraulic pressure generating chambers to the other two of the wheel braking apparatuses, a second hydraulic pressure generating apparatus being power driven and generating an assist hydraulic pressure that is added to the hydraulic pressure in each of the first hydraulic circuit and the second hydraulic circuit generated by the first hydraulic pressure generating apparatus, detecting means for detecting a braking operation variable in response to the braking operation by the driver, target value determining means for determining, on the basis of the detected braking operation variable, a first assist hydraulic pressure target value in the first hydraulic circuit and a second assist hydraulic pressure target value in the second hydraulic circuit to be both greater than zero over a range where the braking operation variable is greater than a predetermined value at which the assist force by the vacuum booster is started, and pressure regulating means for regulating the assist hydraulic pressure in each of the first hydraulic circuit and the second hydraulic circuit to mach each of the first assist hydraulic pressure target value and the second assist hydraulic pressure target value determined by the target value determining means.

According to another aspect of the present invention, a braking control apparatus for a vehicle includes four wheel braking apparatuses for applying a braking torque to front-right, front-left, rear-right, and rear-left wheels in response to a braking hydraulic pressure supplied to wheel cylinders provided at the respective wheels, a first hydraulic pressure generating apparatus including two hydraulic pressure generating chambers each generating a hydraulic pressure in response to a braking operation by a driver of a vehicle, a vacuum booster generating an assist force for assisting a breaking operation performed by the driver relative to the first hydraulic pressure generating apparatus, a first hydraulic circuit hydraulically connecting one of the hydraulic pressure generating chambers to the two of the wheel braking apparatuses, a second hydraulic circuit hydraulically connecting the other one of the hydraulic pressure generating chambers to the other two of the wheel braking apparatuses, a second hydraulic pressure generating apparatus being power driven and generating an assist hydraulic pressure that is added to the hydraulic pressure in each of the first hydraulic circuit and the second hydraulic circuit generated by the first hydraulic pressure generating apparatus, detecting means for detecting a braking operation variable in response to the braking operation by the driver, target value determining means for determining, on the basis of the detected braking operation variable, a first assist hydraulic pressure target value in the first hydraulic circuit and a second assist hydraulic pressure target value in the second hydraulic circuit to both increase from zero in association with an increase of the braking operation variable from a value equal to or smaller than a predetermined value at which the assist force by the vacuum booster is started, the target value determining means determining the braking operation variable obtained in a case where each of the first and second assist hydraulic pressure target values reaches a maximum value of the assist hydraulic pressure generated by the second hydraulic pressure generating apparatus to be greater than the braking operation variable obtained in a case where the assist force generated by the vacuum booster reaches a maximum value, and pressure regulating means for regulating the assist hydraulic pressure in each of the first hydraulic circuit and the second hydraulic circuit to mach each of the first assist hydraulic pressure target value and the second assist hydraulic pressure target value determined by the target value determining means.

BRIEF DESCRIPTION OF THE DRAWINGS

The foregoing and additional features and characteristics of the present invention will become more apparent from the following detailed description considered with reference to the accompanying drawings, wherein.

DETAILED DESCRIPTION

A braking control apparatus for a vehicle (hereinafter simply referred to as a "braking control apparatus") according to an embodiment of the present invention will be explained with reference to the attached drawings.

[Overall Structure of Apparatus]

First, an overall structure of the braking control apparatus according to the present embodiment will be explained with reference to FIGS. 1 and 2. A master cylinder MC serving as a first hydraulic pressure generating apparatus includes two hydraulic pressure generating chambers (not shown). In response to an operation of a brake pedal BP serving as a braking operation member performed by a driver (i.e., braking operation), a braking pressure (i.e., braking hydraulic pressure) is generated at each of the two hydraulic pressure generating chambers. That is, the master cylinder MC generates the braking pressure with the use of power produced by the driver as a power source.

Further, a vacuum booster VB (which is also referred to as a "brake booster") is provided at the master cylinder MC for the purposes of reducing a brake pedal operation force by boosting a depressing force applied to the brake pedal BP. The vacuum booster VB assists the braking operation performed by the driver with the use of a negative pressure as a power source.

Braking operation variable detecting means BS serving as detecting means detects an operation level or variable of the brake pedal BP (i.e., braking operation variable Bs) performed by the driver. Specifically, a master cylinder pressure sensor PM# is provided at each of two hydraulic circuits that serve as first and second hydraulic circuits, and that are connected to the master cylinder MC or the respective hydraulic pressure generating chambers of the master cylinder MC. Then, a detection result of the master cylinder pressure sensor PM#, i.e., a master cylinder pressure Pm#, is used as the braking operation variable Bs.

As explained above, the symbol # affixed to the end of each reference sign indicates a comprehensive notation, such as "f" and "r", that is affixed to indicate which hydraulic circuit in a dual circuit brake system (i.e., including first and second hydraulic circuits) the reference sign is for. In the case of a front-rear dual circuit constituted by a front wheel brake circuit connected to front left and right wheels and a rear wheel brake circuit connected to rear left and right wheels, "f" indicates the front wheel brake circuit while "r" indicates the rear wheel brake circuit. In the case of a diagonal dual circuit (which is also called an X-type dual circuit) constituted by a first brake circuit connected to the front left wheel and the rear right wheel and a second brake circuit connected to the front right wheel and the rear left wheel, "1" indicates the first brake circuit while "2" indicates the second brake circuit. Hereinafter, the symbol # applies in such manner as described above.

Figure 1:
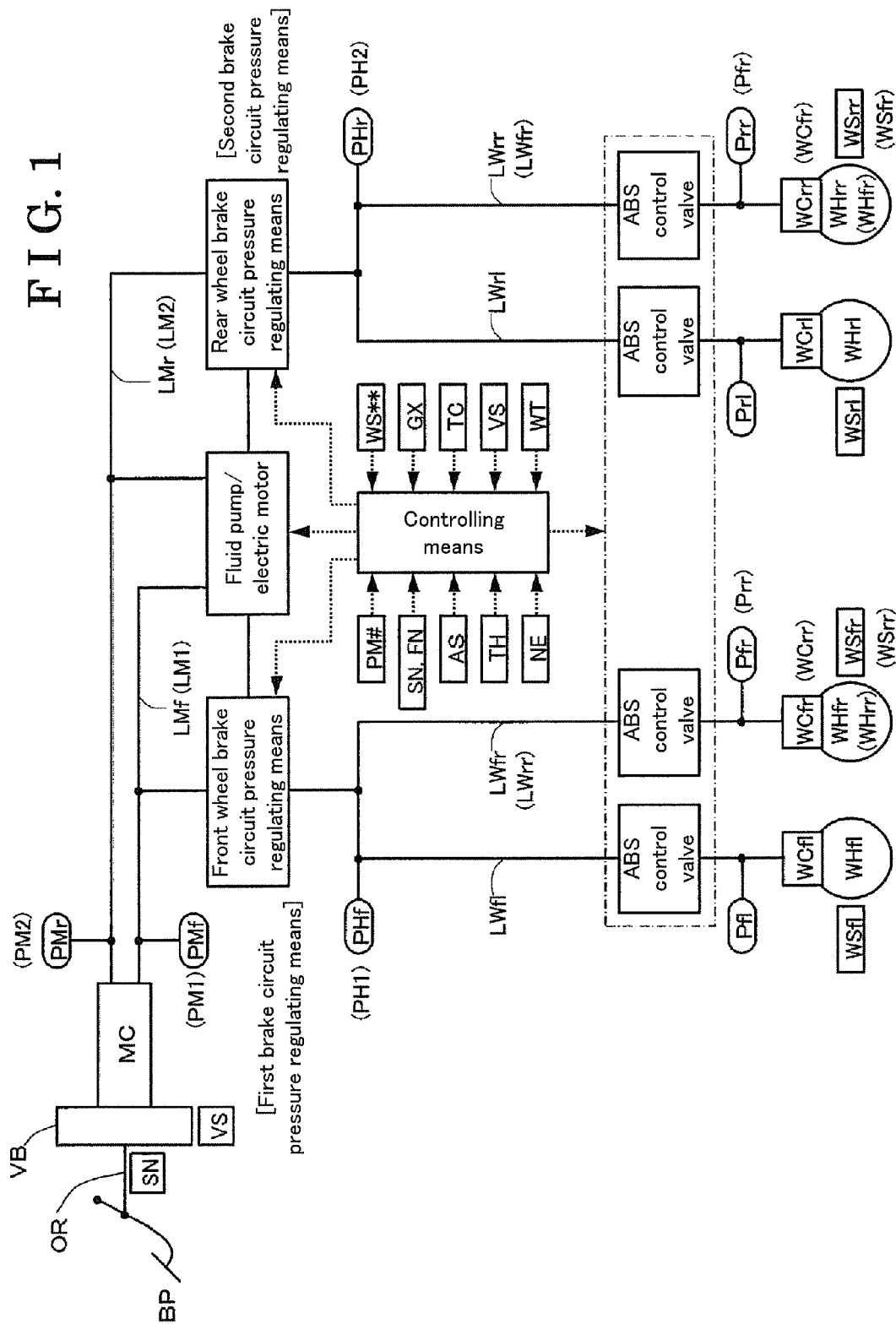
FIG. 1 is a diagram illustrating an overall structure of a braking control apparatus for a vehicle according to an embodiment of the present invention.
Figure 2:
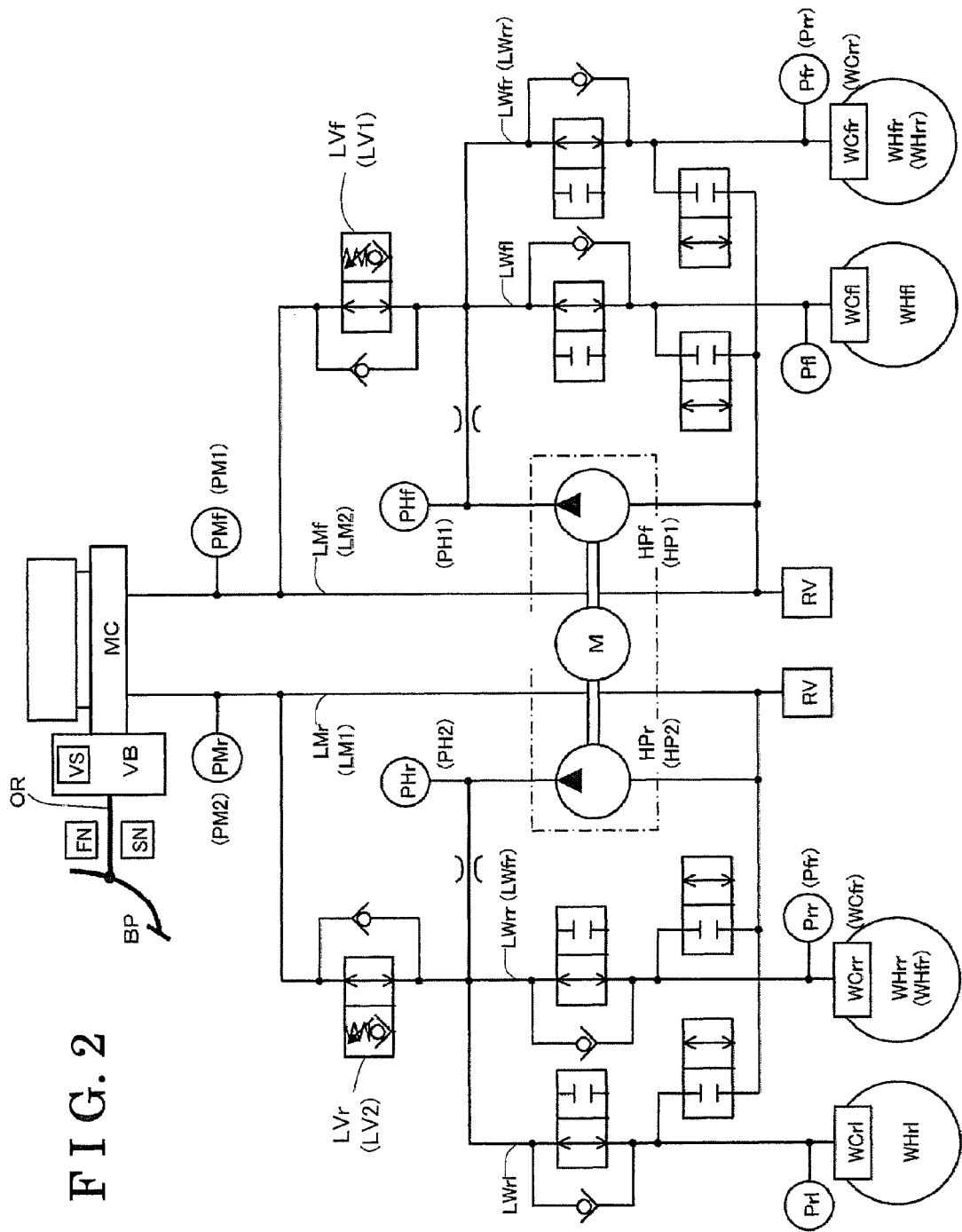
FIG. 2 is a diagram illustrating details of a brake hydraulic circuit in the overall structure of the braking control apparatus illustrated in FIG. 1.

In FIGS. 1 and 2, the front-rear dual circuit is mainly shown but the diagonal dual circuit is also shown by reference signs in parentheses, which is also applied to the other drawings.

A detection value of a displacement of the brake pedal BP or an operating rod OR (i.e., operation variable detection value), specifically, a displacement or a rotational angle of an attaching portion of the brake pedal BP, a stroke of the operating rod OR, and the like may be used as the braking operation variable Bs. Alternatively, a detection value of an operation force of the brake pedal BP or the operating rod OR (i.e., operation variable detection value), specifically, a depression force of the brake pedal BP, a thrust force of the operating rod OR, and the like may be used as the braking operation variable Bs.

The aforementioned "displacement" and the "operation force" are different in wording depending on a portion where the detection is made, i.e., the brake pedal BP, the operating rod OR, or the like. However, since the brake pedal BP, the operating rod OR (both of which serve as the braking operation member), and the like are mechanically connected to each other, detection values thereof are equivalent to each other. In this case, an objective that should be detected is a value corresponding to the "displacement" or the "operation force" obtained at the braking operation member. Thus, in the following, means for detecting the displacement will be comprehensibly referred to as braking input stroke detecting means (i.e., sensor) SN and its detection result will be referred to as a braking input stroke Si. In the same way, means for detecting the operation force will be comprehensibly referred to as braking input force detecting means (i.e., sensor) FN and its detection result will be referred to as a braking input force Fi. The braking input stroke Si and the braking input force Fi can be used as the braking operation variable Bs.

An electric motor M is driven on the basis of an adjusted assist pressure target value SP#t (i.e., first and second assist hydraulic pressure target values) to be mentioned later. A fluid pump HP# (i.e., hydraulic pump) is driven by the electric motor M. That is, a braking pressure is generated to assist the operation force of the driver by a power source such as an electric power supply separately and independently provided from the negative pressure and the operation force generated by the driver. The pump HP# suctions a portion of fluid discharged from the master cylinder MC and then discharges the fluid to a wheel cylinder WC provided at a wheel WH. The wheel cylinder WC** serves as a portion of a wheel braking apparatus.

As explained above, the symbol  affixed to the end of each reference sign indicates a comprehensive notation, such as "fl" and "fr", that is affixed to indicate which wheels the reference sign is for. For example, the wheel cylinder WC comprehensively indicates the front left wheel cylinder WCfl, the front right wheel cylinder WCfr, the rear left wheel cylinder WCrl, and the rear right wheel cylinder WCrr. Hereinafter, the symbol ** applies in such manner as described above.

The pump HP# suctions fluid from a conduit LM# and then discharges the fluid to a conduit LW. The conduits LM# and LW collectively constitute the hydraulic circuit. The resulting movement of the fluid generates an auxiliary braking pressure (i.e., assist hydraulic pressure) relative to the braking pressure generated by the master cylinder MC that is assisted by the vacuum booster VB. The electric motor M and the pump HP# collectively serve as a second hydraulic pressure generating apparatus.

Pressure regulating means correspond to, for example, a linear solenoid valve LV# (which may be also referred to as a linear pressure regulating valve or a linear control valve). The pressure generated by the pump HP# that is driven by the electric motor M is regulated by means of the linear solenoid valve LV# based on the adjusted assist pressure target value SP#t. Then, the braking pressure generated by the pump HP# and the electric motor M (i.e., assist hydraulic pressure) is added to the braking pressure generated by the master cylinder MC (i.e., master cylinder pressure Pm#). The total braking pressure is applied to the wheel cylinder WC** accordingly. The revolutions of the electric motor M are controlled so that the additional braking pressure is generated by the pump HP#. The final regulation of the braking pressure is conducted by the linear solenoid valve LV#.

[Vacuum Assist by Vacuum Booster]

Figure 3:
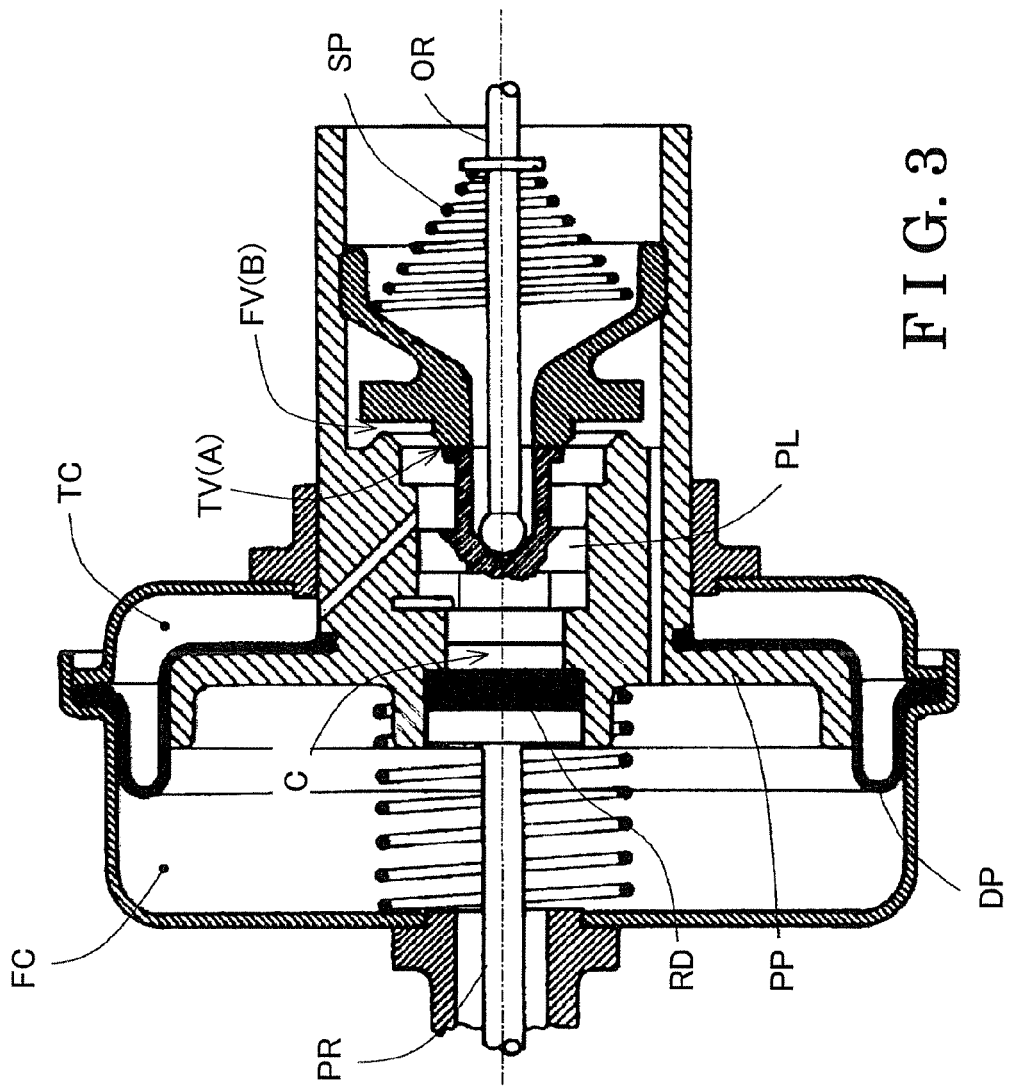
FIG. 3 is a cross-sectional view illustrating a main portion of a vacuum booster according to the embodiment of the present invention.

Next, an assisting operation (i.e., boosting operation) performed by the vacuum booster VB (hereinafter comprehensibly referred to as a "vacuum assist") will be explained with reference to FIG. 3. The vacuum booster VB generates a force for pushing a power piston PP with the use of a pressure difference between an atmospheric pressure and a negative pressure that is generated by a vacuum source such as a negative pressure of an engine intake system and a vacuum pump. The vacuum booster VB then assists the operation force of the braking operation member produced by the driver.

In the case of a non-braking operation (i.e., the brake pedal BP is not depressed by the driver), a gap A is closed (i.e., an atmospheric pressure valve TV is in a closed state) and a gap B is open (i.e., a vacuum valve FV is in an open state). Thus, an atmospheric pressure chamber (which may be also referred to as a variable pressure chamber) TC and a vacuum chamber (which may be also referred to as a constant pressure chamber) FC are balanced out at the negative pressure. The atmospheric pressure chamber TC and the vacuum chamber FC are defined and divided by means of a diaphragm DP. In cases where the brake pedal BP is depressed by the driver, the operating rod (which may be also referred to as an input rod) OR moves forward (i.e., leftward in FIG. 3) and then the vacuum valve FV is brought to the closed state (i.e., gap B is closed). When the operating rod OR further moves forward, a plunger PL moves forward to bring the atmospheric pressure valve TV to the open state (i.e., gap A is open). As a result, air flows into the atmospheric pressure chamber TC to thereby generate the pressure difference with the vacuum chamber FC. The power is generated to push the power piston PP accordingly.

At this time, the operating rod OR does not directly push a push rod (which may be also referred to as an output rod) PR and only pushes a spring SP. In such a way, jumping (or jump-in) characteristics can be obtained, increasing an output from a small operation force (i.e., small brake pedal depression).

When the brake pedal BP is further depressed, the plunger PL moves forward while pressing a reaction disc RD to thereby enlarge an opening portion (i.e., gap A) of the atmospheric pressure valve TV. Then, the air further flows into the atmospheric pressure chamber TC so that the pressure difference between the atmospheric pressure chamber TC and the vacuum chamber FC increases. The assisting operation of the vacuum booster VB increases accordingly. The jumping characteristics are controllable by a size of a clearance C defined between the plunger PL and the reaction disc RD (specifically, sizes of the clearance C and the gap B).

In cases where the brake pedal BP is returned from the depressed state to an initial state (i.e., initial position where the brake pedal BP is not depressed), the operating rod OR and the plunger PL are also returned by means of the spring SP to thereby bring the atmospheric pressure valve TV to the closed state and the vacuum valve FV to the open state. As a result, the non-braking operation state is restored.

Accordingly, the vacuum booster VB mechanically produces a pressure difference between the atmospheric pressure chamber TC and the vacuum chamber FC by an opening and closing of the atmospheric pressure valve TV and the vacuum valve FV in association with the displacement of the operating rod OR to thereby perform the assisting operation. The vacuum assist is performed accordingly.

[Pump Assist]

Figure 4:
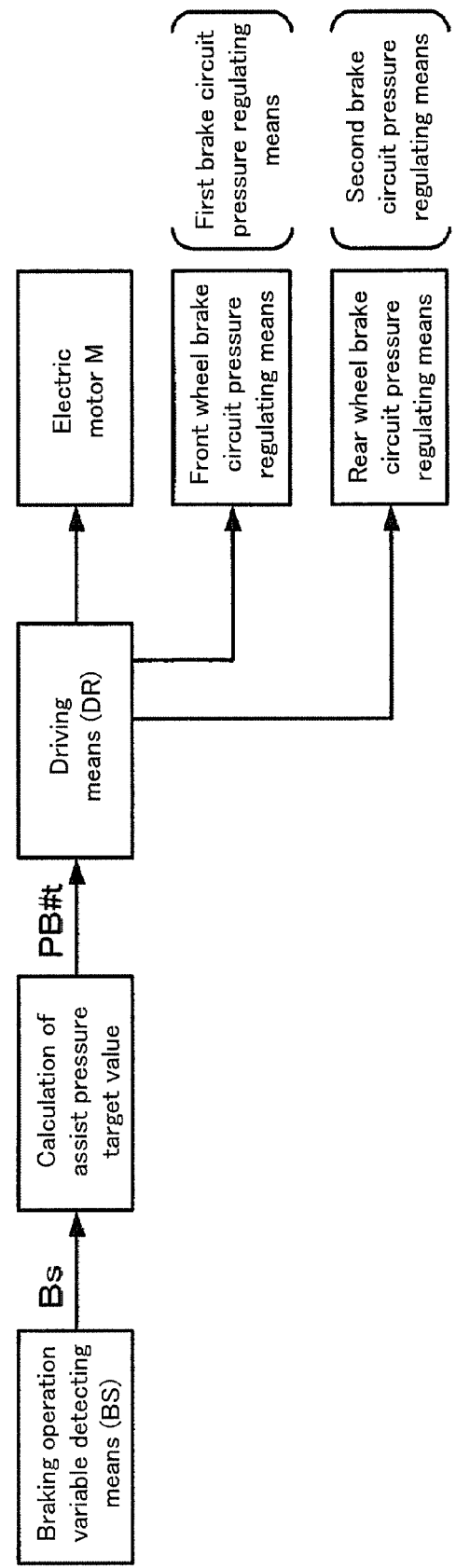
FIG. 4 is a functional block diagram in cases where an assist hydraulic pressure control for a pump assist is performed.

Next, an assisting operation (i.e., boosting operation) performed by the pump HP# and the electric motor M that drives the pump HP# (hereinafter comprehensively referred to as a "pump assist") will be explained with reference to FIG. 4.

A target value of a pressure (i.e., assist pressure target value PB#t) for assisting or boosting the braking pressure generated by the master cylinder MC (i.e., master cylinder pressure Pm#) is calculated on the basis of the operation variable of the braking operation member performed by the driver (i.e., braking operation variable Bs). The braking operation variable Bs is calculated on the basis of a detection result of the detecting means BS. At least one of the aforementioned braking input stroke detecting means SN, the braking input force detecting means FN, and the master cylinder pressure sensor PM#, or two or more thereof can be used as the detecting means BS.

The assist pressure target value PB#t (hereinafter simply referred to as an "assist pressure PB#t") is calculated on the basis of the braking operation variable Bs of the driver with the consideration of basic specifications of a vehicle. In this case, the basic specifications of a vehicle include a vehicle weight Wt, a center of gravity, a wheel base L, and the like, all of which are variable depending on passengers or loading conditions. However, a predetermined state (i.e., a predetermined number of passengers and loading weight) is assumed for the basic specifications of a vehicle.

Driving means DR controls a wheel cylinder pressure Pw** at each wheel by adding the assist pressure PB#t generated by the pump HP# and the electric motor M to the master cylinder pressure Pm# on which the vacuum assist is applied. That is, the driving means DR controls the revolutions of the electric motor M based on the assist pressure PB#t and activates the pressure regulating means such as the linear solenoid valve LV#.

On the basis of the assist pressure PB#t, the revolutions of the electric motor M is controlled so that a higher speed of the motor HP# is obtained than a speed at which the assist pressure PB#t is generated. A target pressure value Ph#t of each hydraulic circuit is calculated on the basis of the detection result of the detecting means BS (for example, master cylinder pressure Pm#) and the assist pressure PB#t (precisely, adjusted assist pressure target value SP#t to be mentioned later). That is, a relationship of Ph#t=Pm#+PB#t (SP#t) is defined.

An electric current value for driving and controlling the linear solenoid valve LV# is determined on the basis of the target pressure value Ph#t. A hydraulic circuit pressure sensor PH# (i.e., braking pressure detecting means) is provided at each of the hydraulic circuits or a wheel cylinder pressure sensor P (i.e., braking pressure detecting means) is provided at each of the wheels. Then, the feedback control is performed so that an actual pressure (i.e., Ph#a and Pwa) detected by the pressure sensors matches the target pressure value Ph#t. Some of or all of the pressure sensors PH# and P** may be omitted and at that time the pressure of each of the hydraulic circuits can be estimated on the basis of the motion of the wheels, the operating state of the solenoid valve, and the like.

[Assist Pressure PB#t]

Figure 5:
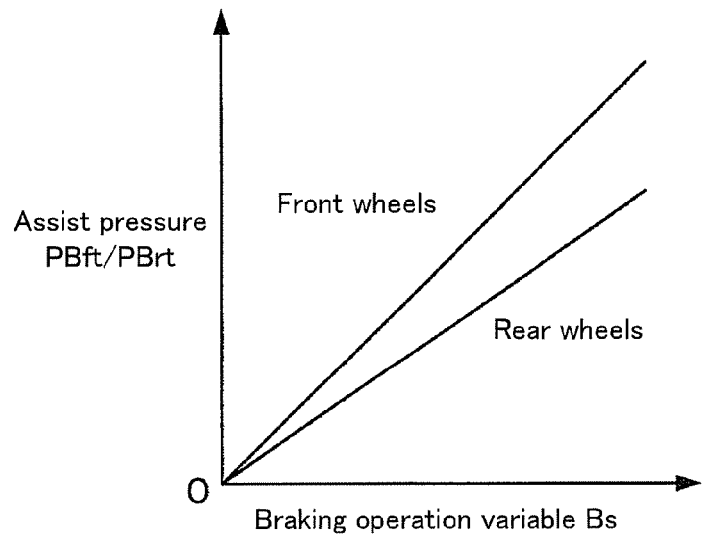
FIG. 5 is a graph illustrating a table specifying a relationship between a braking operation variable and an assist pressure target value in case of a front-rear dual circuit.

The calculation of the assist pressure PB#t will be explained with reference to FIGS. 5 to 8. First, a case where the dual circuit brake system is constituted by the front-rear dual circuit will be explained. FIG. 5 is a graph illustrating a table specifying a relationship between assist pressures PBft and PBrt, and the braking operation variable Bs. The front wheel assist pressure PBft and the rear wheel assist pressure PBrt are specified in response to the braking operation variable Bs. Specifically, the front wheel assist pressure PBft and the rear wheel assist pressure PBrt increase in association with the increase of the braking operation variable Bs. The front wheel assist pressure PBft and the rear wheel assist pressure PBrt can be separately and individually characterized.

Figure 6:
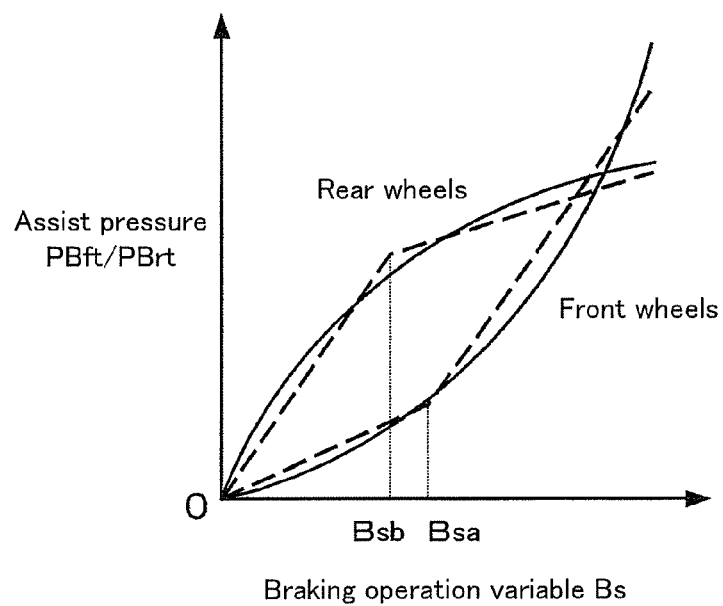
FIG. 6 is another graph illustrating a table specifying a relationship between the braking operation variable and the assist pressure target value in case of the front-rear dual circuit.

As illustrated in FIG. 6, the front wheel assist pressure PBft is also characterized to form a downwardly curving (i.e., convex) line relative to the braking operation variable Bs as shown by a solid line, or to form multiple lines of which gradients sequentially increase in response to the increase of the braking operation variable Bs as shown by a broken line that is an approximation of the aforementioned downwardly curved line. In the same way, the rear assist pressure PBrt is also characterized to form an upwardly curving (i.e., convex) line relative to the braking operation variable Bs as shown by a solid line or to form multiple lines of which gradients sequentially decrease in response to the increase of the braking operation variable Bs as shown by a broken line that is an approximation of the aforementioned upwardly curved line.

By the adoption of at least one of the aforementioned characteristics described in FIGS. 5 and 6, the distribution ratio of the braking force between the front wheels and the rear wheels can be made closer to an ideal braking force distribution ratio (i.e., distribution ratio of the braking force at the front wheels in parallel with a load applied thereto and the braking force at the rear wheels in parallel with a load applied thereto in consideration of a load shift between the front wheels and the rear wheels at the braking). Accordingly, in the case of the front-rear dual circuit, the assist pressure PB#t can be separately and individually specified to the front wheels and the rear wheels relative to the braking operation variable Bs.

Figure 7:
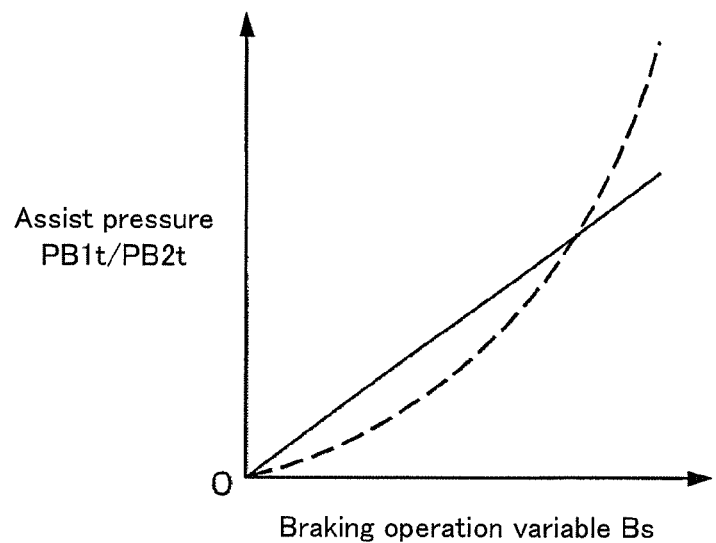
FIG. 7 is a graph illustrating a table specifying a relationship between the braking operation variable and the assist pressure target value in case of a diagonal dual circuit.

On the other hand, in the case of the diagonal dual circuit, an assist pressure PB1t and an assist pressure PB2t are calculated on the basis of the same characteristics as illustrated in FIG. 7.

In the case of specifying the aforementioned assist pressure PB#t, the application of an auxiliary pressure (i.e., assist hydraulic pressure) is started when the braking operation variable Bs is equal to a zero or near-zero value (i.e., minimal value). That is, the assist pressure PB#t is specified to be greater than zero over a range where the braking operation variable Bs is greater than a predetermined value (i.e., zero or near-zero value such as minimal value) at which generation of the assist force of the vacuum booster VB is started.

In this case, a zero value of the braking operation variable Bs indicates a state where the braking operation is not performed (i.e., non-braking operation state). That is, the application of the auxiliary pressure by the pump HP# (i.e., pump assist) is started substantially at the same time when the assisting operation is started by the vacuum booster VB (i.e., vacuum assist).

Figure 8:
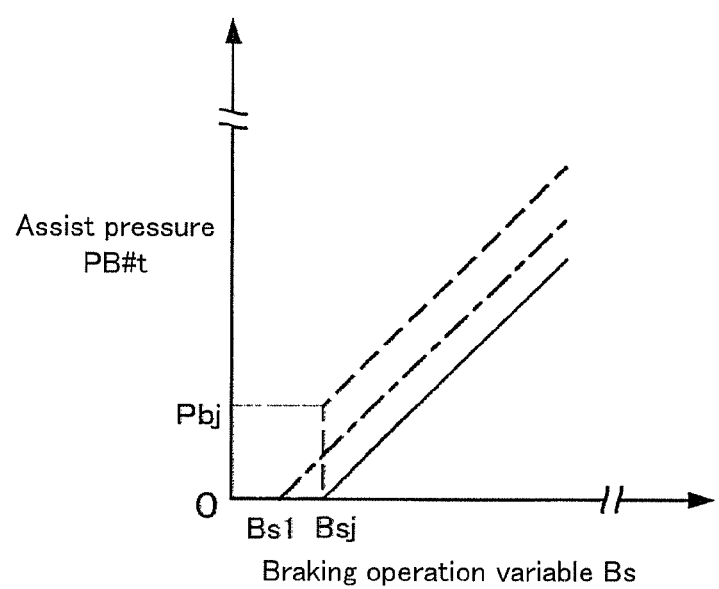
FIG. 8 is a graph illustrating a table specifying a relationship between the braking operation variable and the assist pressure target value in consideration of jumping characteristics of the vacuum booster.

FIG. 8 illustrates details of characteristics of the assist pressure PB#t when the braking operation variable Bs is in the vicinity of a zero value. As illustrated by a solid line in FIG. 8, in order to bring the pump assist to start simultaneously with the jumping (i.e., jump-in) of the vacuum booster VB, the application of the auxiliary pressure can be started when the braking operation variable Bs reaches a value Bsj (which is included in the predetermined value) at which the jumping of the vacuum booster VB is started.

That is, the assist pressure PB#t is specified to be zero while the braking operation variable Bs is equal to or smaller than the value Bsj. Then, the assist pressure PB#t increases from a zero value along with the increase of the braking operation variable Bs from the value Bsj.

The pump assist can have characteristics simulating the jumping characteristics of the vacuum booster VB. That is, as illustrated by a broken line in FIG. 8, the assist pressure PB#t is kept at zero while the braking operation variable Bs is equal to or smaller than the value Bsj. Then, the assist pressure PB#t is specified to increase from a value Pbj (>0) in association with the increase of the braking operation variable Bs from the value Bsj. Accordingly, the jumping effect of the vacuum booster VB can be improved.

Further, in the case of specifying the assist pressure PB#t, the application of the auxiliary pressure is started when the braking operation variable Bs is equal to a value Bs1 that is smaller than the value Bsj. That is, as illustrated by a dashed-dotted line in FIG. 8, the assist pressure PB#t is kept at zero while the braking operation variable Bs is equal to or smaller than the value Bs1 (<Bsj). Then, the assist pressure PB#t is specified to increase from zero in association with the increase of the braking operation variable Bs from the value Bs1. Accordingly, a dead zone of the braking pressure caused by, for example, a clearance formed between a brake pad and a brake rotor (not shown) (i.e., a zone where the braking pressure is prevented from increasing even when the braking operation variable increases in view of characteristics between the braking operation variable and the braking pressure) can be compensated. In this case, the brake pad and the brake rotor each serve as a portion of the wheel braking apparatus. Further, a responsiveness of the electric motor M at the start-up thereof can be compensated.

In the pump assist, the detecting means BS detects the braking operation variable Bs on the basis of which the assist pressure PB#t is specified. The electric motor M is then driven to generate the additional pressure applied to the master cylinder pressure Pm# on which the vacuum assist is performed. Finally, the linear solenoid valve LV# is regulated. Since such processes are electronically controlled, the pump assist includes dynamics in a total control system accompanied by a time delay.

On the other hand, the vacuum assist is performed by means of a mechanical structure. Thus, the braking operation feeling of the driver is different between the vacuum assist and the pump assist even for the similar assisting operation. In particular, in cases where a change point is present in the assisting operation, i.e., the vacuum assist is changed to the pump assist (such as disclosed in JP9030385A), the pump assist is added to the vacuum assist in operation (such as disclosed in JP9323641A), the difference in the braking operation feeling of the driver between the vacuum assist and the pump assist becomes prominent.

On the other hand, according to the present embodiment, the application of the assist pressure by means of the pump assist is started when the braking operation variable Bs is a zero or near-zero value (i.e., minimal value) at which the vacuum assist is also started. Thus, the driver is prevented from having an uncomfortable feeling in the braking operation caused by a combination of two types of assisting operations having different operating principles from each other.

Further, the assist pressure PB#t can be specified as zero until the braking operation variable Bs reaches the value Bsj at which the jumping of the vacuum booster VB is started. Then, the assist pressure PB#t is started (i.e., changed from zero to a larger value) at the same time as the jumping of the vacuum booster VB. The target value of the assist pressure by means of the pump assist is specified to match the jumping characteristics of the vacuum booster VB to thereby achieve the smooth combination of the assisting operations (i.e., vacuum assist and pump assist) having the different operating principles. Accordingly, the sudden or stepwise increase of an output (specifically, braking pressure and assist force) in the vacuum assist, which may be caused by the jumping characteristics of the vacuum assist, is prevented.

As explained above, "to match the jumping characteristics" does not mean, "to completely and fully match the jumping characteristics". Thus, the assist pressure PB#t may be started (i.e., changed from zero to a larger value) when the baking operation variable Bs reaches a value smaller than the value Bsj, or when the braking operation variable Bs reaches a value slightly larger than the value Bsj.

Accordingly, in the case of specifying the assist pressure PB#t, the application of the auxiliary pressure is started when the braking operation variable Bs is equal to a zero or near-zero value (i.e., minimal value), to the value Bsj, or to the value smaller than the value Bsj. The assist pressure PB#t is specified to increase from zero in association with an increase of the braking operation variable Bs from a value equal to or smaller than the predetermined value (i.e., zero or near-zero value, Bsj, or value smaller than Bsj) at which the assist force of the vacuum booster VB is started. That is, the assist pressure PB#t is specified to be zero or more while the braking operation variable Bs is in a range from zero to the predetermined value. In addition, the assist pressure PB#t is specified larger than zero while the braking operation variable Bs is greater than the predetermined value. Means for specifying the assist pressure target value PB#t serve as a portion of target value determining means.

[Variable Control of the Assist Pressure by the Pump Assist]

One of the purposes of the braking control apparatus according to the present embodiment is to obtain a substantially constant vehicle deceleration speed in the braking operation of the driver (i.e., to obtain substantially constant increase characteristics of the vehicle deceleration speed relative to the braking operation variable Bs).

Since the aforementioned pump assist is electronically controlled, the increase characteristics of the assist force (i.e., assist hydraulic pressure) relative to the braking operation variable Bs is variable. Further, the pump assist is started when the braking operation variable Bs is a zero or near-zero value. Thus, a relationship between the braking operation and the vehicle deceleration speed can be maintained virtually constant over the entire braking operation. According to the present embodiment, the substantially constant vehicle deceleration speed can be smoothly obtained in the braking operation of the driver while the two types of the assisting operations (i.e., vacuum assist and pump assist) are combined.

However, on the other hand, the relationship between the braking operation and the vehicle deceleration speed is variable depending on a load capacity of a vehicle, a decrease in negative pressure because of its consumption, breakage, or change in driving condition of the engine, and the like. In the following, a variable control of the assist pressure so as to address the variation in the relationship between the braking operation and the vehicle deceleration speed will be explained with reference to FIGS. 9 to 14.

A target value of the pressure regulating means provided at each of the two hydraulic circuits is calculated through an adjustment or a modification of the assist pressure target value PB#t with the use of an adjusted value (or modification factor) specified for each control to be mentioned later. In order to distinguish between the assist pressure target value PB#t and a target value obtained by adjusting or modifying the assist pressure target value PB#t, the target value after the adjustment will be hereinafter referred to as an adjusted assist pressure target value SP#t (or simply called an "adjusted pressure SP#t"). In this case, the driving means DR controls the electric motor M and the solenoid valve LV# based on the adjusted pressure SP#t.

Figure 9:
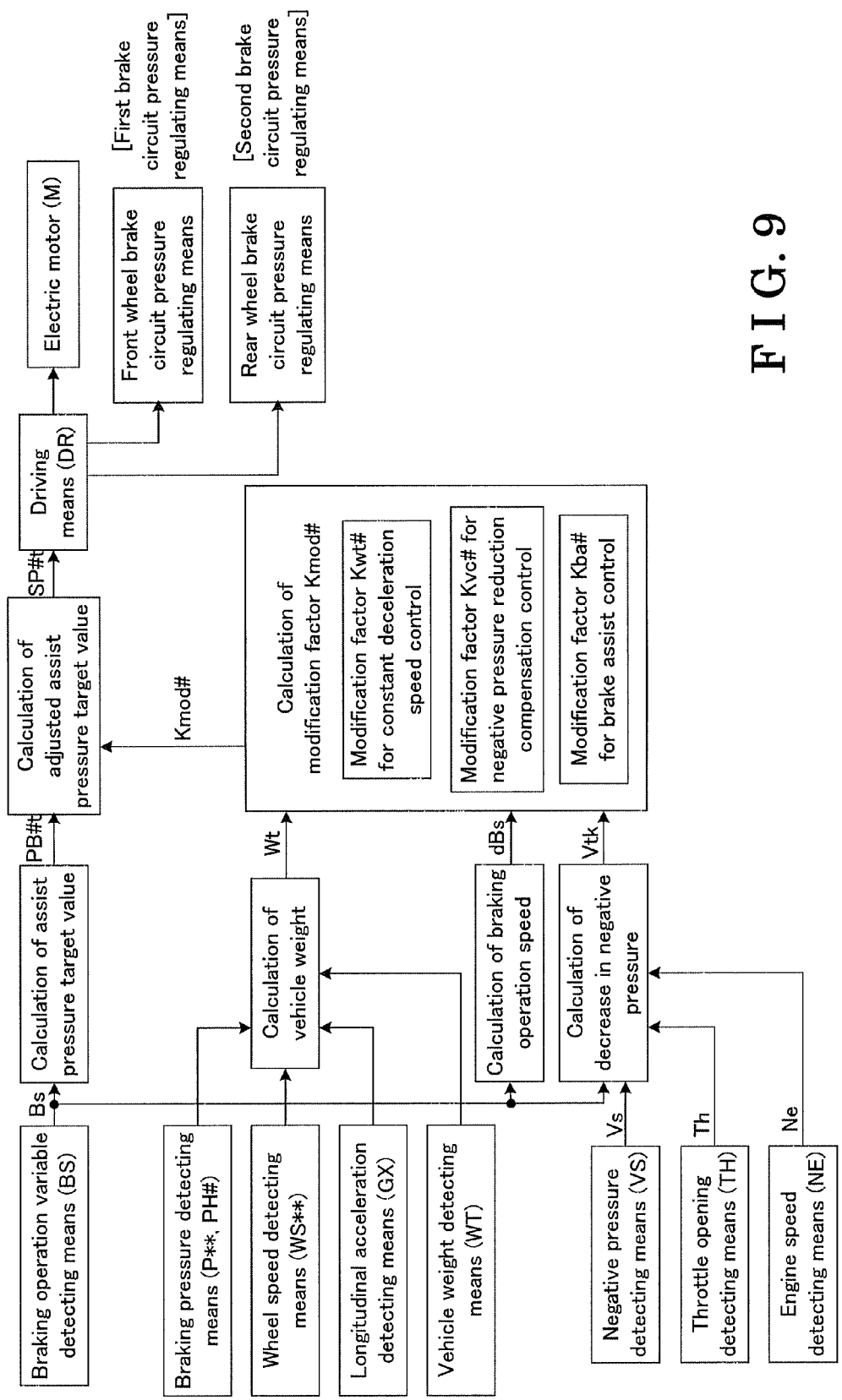
FIG. 9 is a functional block diagram in cases where an assist hydraulic pressure is modified in the assist hydraulic pressure control illustrated in FIG. 4.

As illustrated in FIG. 9, the adjustment of the assist pressure PB#t includes three controls: 1. Constant deceleration speed control, 2. Negative pressure reduction compensation control, and 3. Brake assist control. In each control, the modification factor (i.e., adjusted value) is calculated and then a total modification factor Kmod# is calculated on the basis of the calculated modification factors in the respective controls. The adjusted pressure SP#t obtained by adjusting the assist pressure PB#t with the use of the modification factor Kmod# is calculated as in an equation of SP#t=Kmod#*PB#t.

The total modification factor Kmod# is calculated on the basis of an equation of Kmod#=Kwt#*Kvc#*Kba# wherein Kwt is a modification factor for the constant deceleration speed control, Kvc is a modification factor for the negative pressure reduction compensation control, and Kba is a modification factor for the brake assist control. In this case, not all of these three controls are collectively necessary and at least one of them is sufficient. Accordingly, at least one of the modification factors is kept and the others can be omitted.

As explained above, the adjusted pressure SP#t is obtained by multiplying the assist pressure PB#t by the modification factor. Alternatively, instead of the modification factor, an adjusted value in pressure (i.e., adjusted pressure) is calculated, and then the target pressure SP#t may be calculated by an increase/decrease of the adjusted pressure relative to the assist pressure PB#t.

[Constant Deceleration Speed Control]

The constant deceleration speed control will be explained with reference to FIGS. 10 and 11. According to the constant deceleration speed control, the relationship between the braking operation variable Bs and the vehicle deceleration speed is maintained virtually constant regardless of the change in vehicle weight (i.e., gross weight of the vehicle).

First, a vehicle weight Wt is estimated and then a pump assist level or variable (characteristics of the auxiliary hydraulic pressure) is controlled on the basis of the estimated vehicle weight Wt. The vehicle weight Wt is calculated from the braking pressure of the wheel cylinder provided at each wheel, i.e., wheel cylinder pressure Pw, or a relationship between a total braking force applied to a vehicle body that is calculated on the basis of a pressure Ph# generated at each of the two hydraulic circuits and a vehicle deceleration speed (i.e., longitudinal acceleration Gx). The longitudinal acceleration Gx is calculated from a detection result of a longitudinal acceleration sensor GX (i.e., longitudinal acceleration detecting means) or a wheel speed sensor WS (i.e., wheel speed detecting means).

In addition, the vehicle weight Wt is calculated at a time of acceleration of a vehicle based on a relationship between a total driving force applied to the vehicle body and a vehicle acceleration speed (i.e., longitudinal acceleration Gx). The total driving force is calculated on the basis of an engine output obtained through a throttle opening, engine revolutions, an amount of fuel consumption, and the like, and a gear ratio of a transmission (i.e., shift position).

Further, the vehicle weight Wt is directly obtained from a load sensor WT (i.e., vehicle weight detecting means). In the case of a vehicle equipped with an air suspension, the vehicle weight Wt is calculated on the basis of an internal pressure of an air spring. In the case of a vehicle equipped with a vehicle height sensor, since the spring constant of a suspension is known, the vehicle weight is calculated on the basis of a detection result of the vehicle height sensor.

Figure 10:
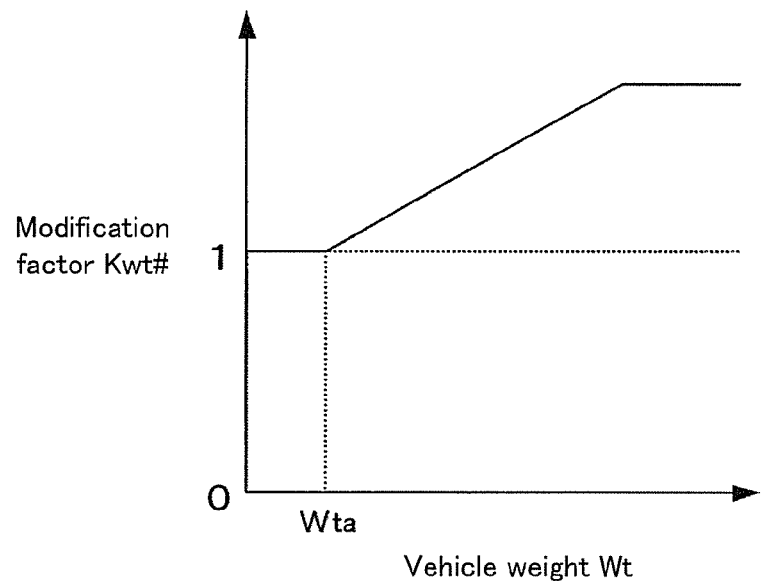
FIG. 10 is a graph illustrating a table specifying a relationship between a vehicle weight and a modification factor of the assist hydraulic pressure in a constant deceleration speed control.
Figure 11:
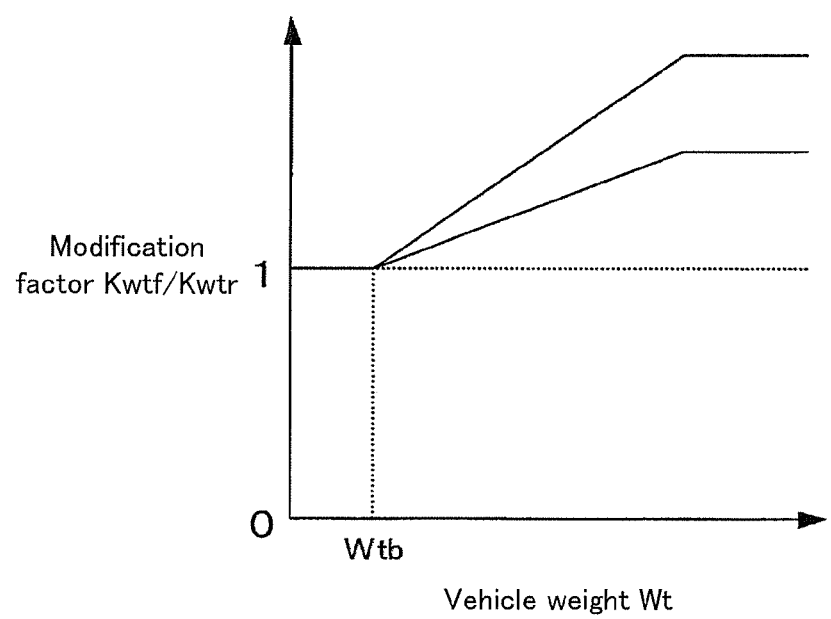
FIG. 11 is a graph illustrating a table specifying a relationship between the vehicle weight and the modification factor of the assist hydraulic pressure in the constant deceleration speed control in case of the front-rear dual circuit according to the embodiment of the present invention.

The modification factor Kwt# is calculated based on the vehicle weight Wt obtained in the aforementioned manner with the use of characteristics (table) illustrated in FIG. 10. The same modification factor Kwt# is specified to both the hydraulic circuits in the case of the diagonal dual circuit. On the other hand, the modification factor Kwt# can be separately and individually specified to the respective hydraulic circuits in the case of the front-rear dual circuit.

The vehicle weight increases when a passenger gets in a rear seat, a loading to a luggage compartment is conducted, and the like. Thus, a ratio of weigh increase is larger at the rear wheels than the front wheels. Then, in the case of the front-rear dual circuit, a rear wheel modification factor Kwtr is specified to be larger than a front wheel modification factor Kwtf as illustrated in FIG. 11. Accordingly, at a time of the increase in the vehicle weight, the braking force distribution at the rear wheels increase to thereby approach the ideal braking force distribution.

[Negative Pressure Reduction Compensation Control]

Figure 12:
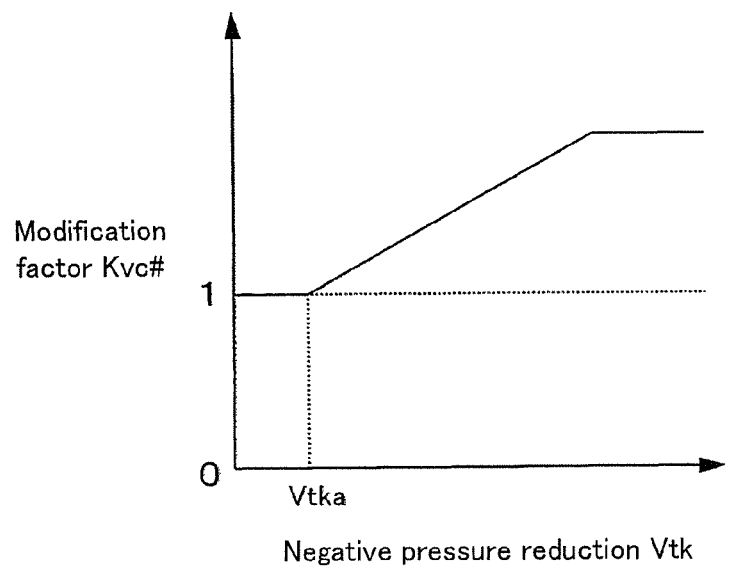
FIG. 12 is a graph illustrating a table specifying a relationship between a negative pressure reduction and the modification factor of the assist hydraulic pressure in a negative pressure reduction compensation control.
Figure 13:
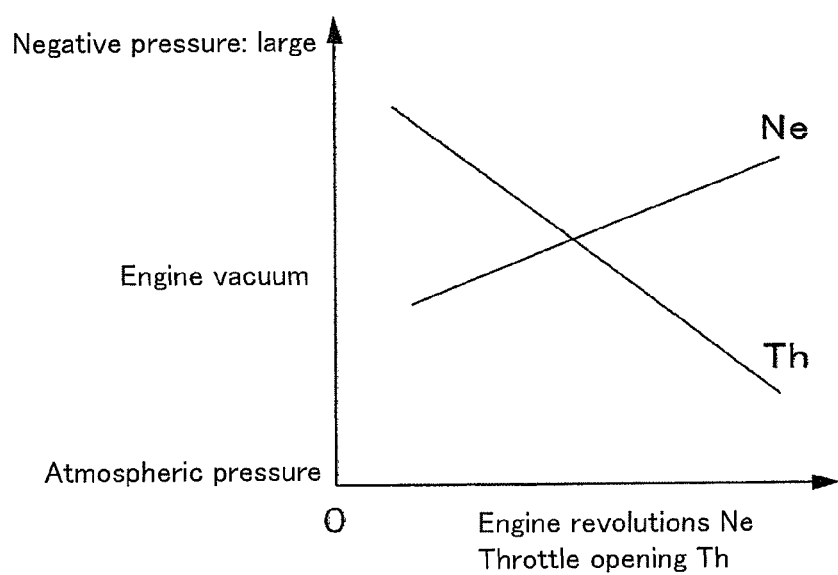
FIG. 13 is a graph illustrating a relationship between engine revolutions/throttle opening and an engine vacuum.

Next, the negative pressure reduction compensation control will be explained with reference to FIGS. 12 and 13. According to the negative pressure reduction compensation control, the output decrease of the vacuum booster VB caused by the decrease in the negative pressure is compensated by a modification of the characteristics of the pump assist pressure.

The decrease in the negative pressure is detected by a negative pressure sensor VS (i.e., negative pressure detecting means) provided at the vacuum booster VB. A detection value Vs of the negative pressure sensor VS is compared with a reference value of the negative pressure, i.e., a value Vso, and then the reduction of negative pressure (i.e., negative pressure reduction Vtk=Vs−Vso) is calculated. Then, the modification factor Kvc# having characteristics as illustrated in FIG. 12 is calculated so as to compensate the decrease in the negative pressure. In the case of the decrease in the negative pressure, the modification factor Kvc# is larger than one. Thus, the assist pressure target value PB# is modified and adjusted to a value larger than that specified in a normal state (i.e., normal negative pressure) so that the pump assist increases.

In cases where the negative pressure is acquired by the engine intake system, the negative pressure state is estimated from an operating state of the engine. For example, as illustrated in FIG. 13, the negative pressure is calculated on the basis of at least one of a throttle opening Th detected by a throttle position sensor TH (i.e., throttle opening detecting means) and engine revolutions Ne detected by an engine speed sensor NE (i.e., engine speed detecting means). Further, the decrease in the negative pressure because of its consumption is estimated on the basis of the operation state of the brake pedal BP such as the number of operations and the braking operation variable.

[Brake Assist Control]

Figure 14:
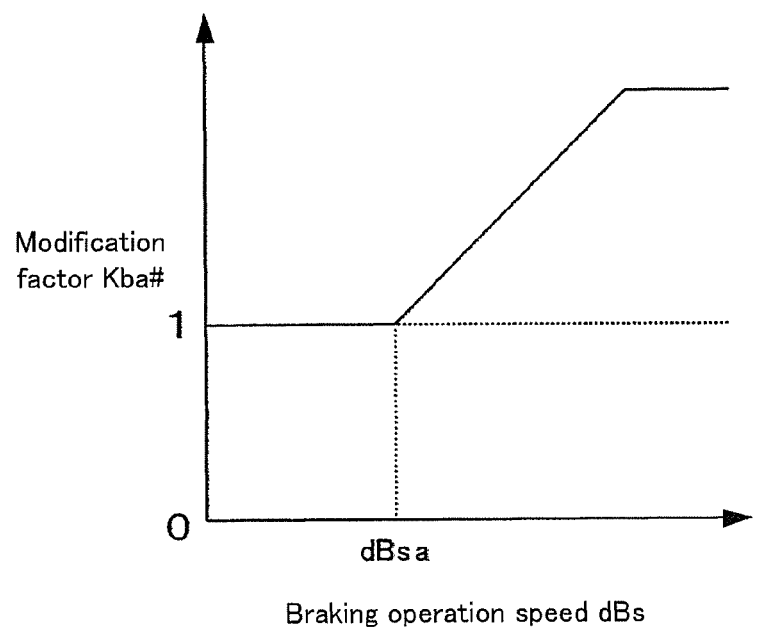
FIG. 14 is a graph illustrating a table specifying a relationship between a braking operation speed and the modification factor of the assist hydraulic pressure in a brake assist control.

The brake assist control will be explained with reference to FIG. 14. The brake assist control is also called a BA control by which the braking pressure larger than that generated in the normal braking operation can be obtained relative to the braking operation variable Bs.

The brake assist control can address the emergency braking by the change of the characteristics of the pump assist. A rate of change of the braking operation variable Bs with respect to time (i.e., rate of change dBs which is also referred to as a braking operation speed) is calculated and then the modification factor Kba# for the brake assist control is calculated on the basis of the calculated rate of change dBs. The modification factor Kba# is calculated with the use of characteristics illustrated in FIG. 14 in response to the braking operation speed dBs.

As explained above, according to the braking control apparatus of the present embodiment, the pump assist is started when the braking operation variable Bs is equal to a minimal value including a zero value, i.e., substantially at the same time as the start of the vacuum assist. Thus, the driver is prevented from having an uncomfortable feeling in the combination of the assisting operations having the different operating principles from each other, and a distinct connecting point between the assisting operations does not exist.

Figure 15:
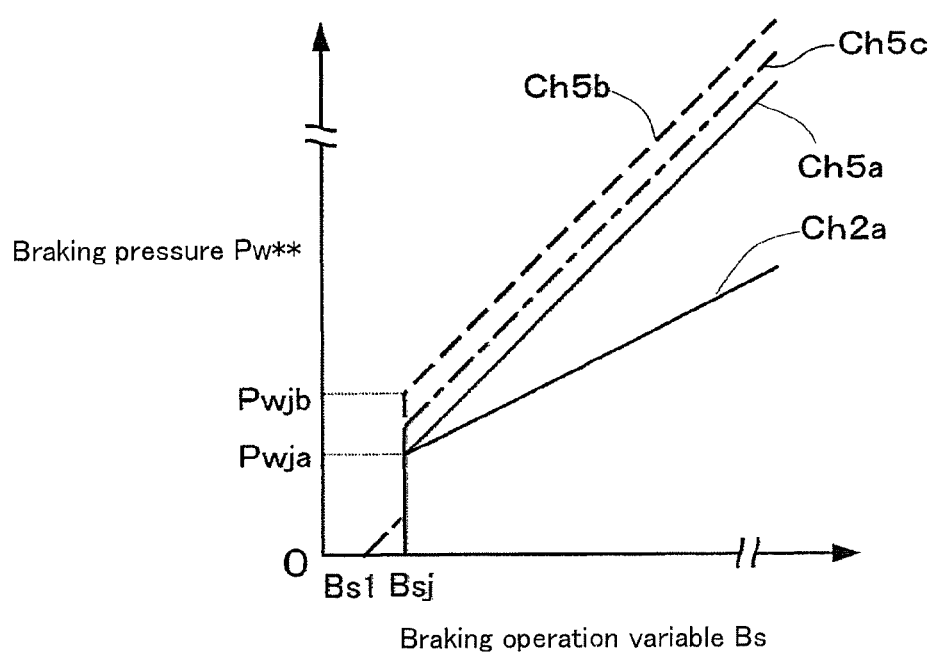
FIG. 15 is a graph illustrating a relationship between the braking operation variable and a braking pressure in consideration with the pumping characteristics.

In addition, as illustrated in FIG. 15, the pump assist may be started when the braking operation variable Bs reaches the value Bsj at which the jumping of the vacuum booster VB occurs. Accordingly, the driver is further prevented from having an uncomfortable feeling in the braking operation. Further, the jumping effect of the vacuum booster VB is improved when the characteristics of the pump assist simulate the jumping characteristics.

Further, the pump assist may be started when the braking operation variable Bs reaches the value Bs1 smaller than the value Bsj. Accordingly, not only the driver is further prevented from having an uncomfortable feeling in the braking operation but also a dead zone of the braking pressure and the responsiveness of the electric motor M at the start-up can be compensated.

In FIG. 15, a characteristic line Ch2a illustrates characteristics of the vacuum assist. The jumping of the vacuum booster VB occurs when the braking pressure reaches a value Pwja. A characteristic line Ch5a illustrates characteristics corresponding to the solid line in FIG. 8. In this case, the pump assist is started when the braking operation variable Bs is equal to the value Bsj (i.e., auxiliary pressure increases from zero). A characteristic line Ch5b illustrates characteristics corresponding to the broken line in FIG. 8. In this case, the jumping effect of the vacuum booster VB is brought to increase by means of the pump assist, and the braking pressure Pw** increases dramatically or in a stepwise manner from zero to a value Pwjb when the braking operation variable Bs is equal to the value Bsj. A characteristic line Ch5c illustrates characteristics corresponding to the dashed-dotted line in FIG. 8. In this case, the pump assist is started when the braking operation variable Bs is equal to the value Bs1 that is smaller than the value Bsj.

Figure 16:
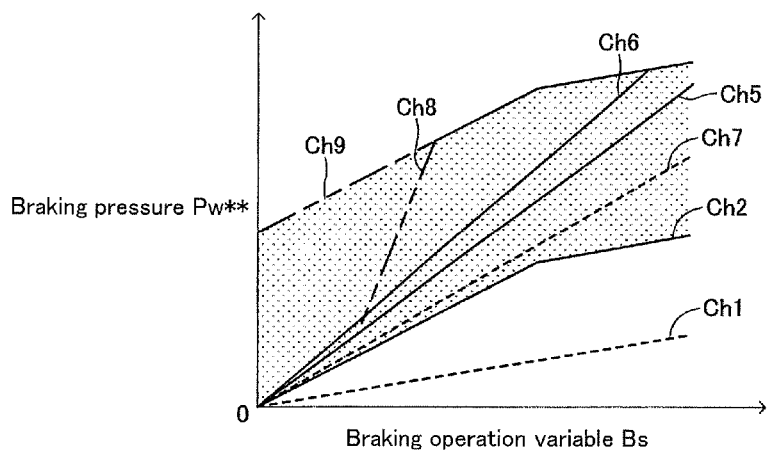
FIG. 16 is a graph illustrating increase characteristics of the braking pressure relative to the braking operation variable in various cases.

FIG. 16 is a graph illustrating increase characteristics of the braking pressure Pw relative to the braking operation variable Bs in various cases. In FIG. 16, a characteristic line Ch1 shows characteristics of the braking pressure Pw in cases where neither the vacuum assist nor the pump assist is performed. A characteristic line Ch2 shows characteristics of the braking pressure Pw** in cases where only the vacuum assist is performed (i.e., Ch1+vacuum assist).

A characteristic line Ch5 shows characteristics of the braking pressure Pw in cases where the pump assist (assist force is not adjusted) in addition to the vacuum assist is performed (i.e., Ch2+pump assist). A characteristic line Ch6 shows characteristics of the braking pressure Pw in cases where the pump assist (assist force is adjusted because of the increase in the vehicle weight) in addition to the vacuum assist is performed. A characteristic line Ch7 shows characteristics of the braking pressure Pw in cases where the pump assist (assist pressure is adjusted because of the decrease in the negative pressure) in addition to the vacuum assist is performed. A characteristic line Ch8 shows characteristics of the braking pressure Pw in cases where the pump assist (brake assist control is performed) in addition to the vacuum assist is performed. A characteristic line Ch9 shows characteristics of the braking pressure Pw** at a time of limit of the pump assist caused by the output limit of the pump or the electric motor M.

The pump assist is variably controlled within a range shown by small dots and surrounded by the output limit of the pump/electric motor and the characteristics of the vacuum assist (i.e., Ch2) in FIG. 16. Thus, the braking pressure characteristics in response to the vehicle weight, the decrease in the negative pressure, the emergency braking can be obtained from the minimal value of the braking operation variable Bs including zero (i.e., non-braking operation state). In addition, in cases where the vacuum assist is not performed at all because of a breakage of the vacuum booster, and the like, the characteristics of the braking pressure Pw** shown by the characteristic line Ch7 can be obtained by means of the pump assist.

[Calculation of the Braking Operation Variable]

The pump assist is electronically controlled. Thus, the time delay in the total control system such as detection, calculation process, and the operation should be considered in the pump assist. In consideration of the dynamics of the braking operation, the operation force is first added to the brake pedal BP by the driver to thereby displace the operating rod OR. The operating rod OR pushes the push rod PR while receiving the assisting operation from the vacuum booster VB (see FIG. 3). Then, the piston within the master cylinder MC moves forward due to the displacement of the push rod PR to thereby generate the braking pressure within the hydraulic circuits and the wheel cylinders.

Accordingly, a signal indicating the master cylinder pressure Pm# is time-delayed relative to the braking operation of the driver. On the other hand, a signal indicating the braking input force F1 (i.e., operation reaction force of the brake pedal BP serving as the braking operation member) or the braking input stroke Si (i.e., displacement of the brake pedal BP) is not time-delayed since the signal indicates an earliest state of the operation of the driver.

Figure 17:
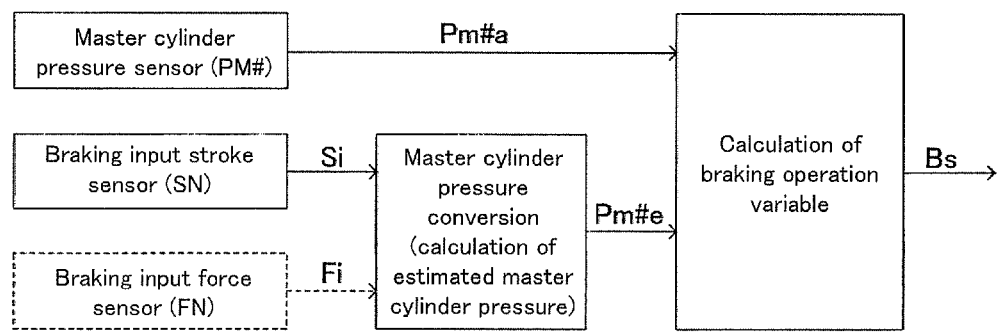
FIG. 17 is a block diagram illustrating a calculation of the braking operation variable by means of which a time delay in a master cylinder pressure can be compensated.

The purpose of the braking operation of the driver is to decelerate a vehicle (vehicle body). According to the braking control apparatus, the braking force is generated at the wheels by means of a friction force produced when the brake pad is pressed against the brake rotor via the braking pressure. Thus, an objective of the braking control is the braking pressure (i.e., pressure of a fluid within the wheel cylinders). Therefore, there is an advantage to use the master cylinder pressure, which is the same physical quantity as the braking pressure, as the braking operation variable. The calculation method of the braking operation variable Bs that can address the compensation of the time delay of the master cylinder pressure while the master cylinder pressure is used as the braking operation variable will be explained with reference to FIG. 17.

Figure 18:
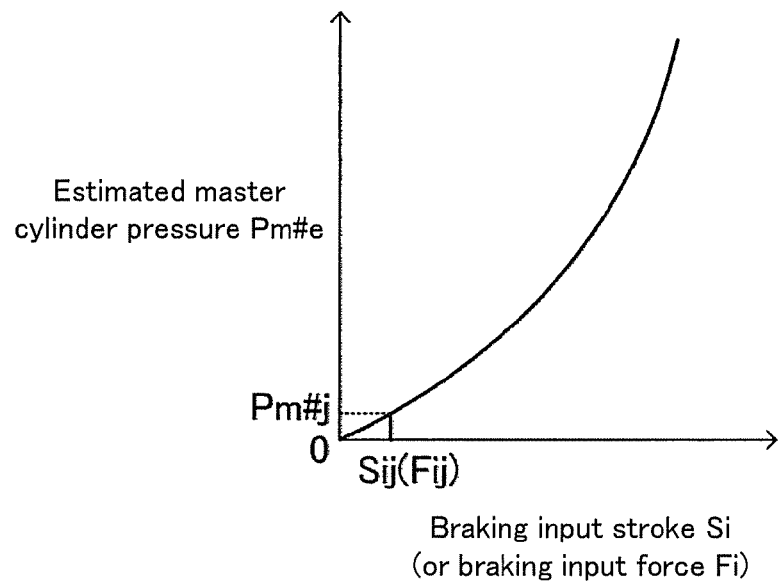
FIG. 18 is a graph illustrating a table specifying a relationship between a braking input stroke (or braking input force) and an estimated master cylinder pressure.

An estimation value of the master cylinder pressure (i.e., estimated master cylinder pressure Pm#e) is calculated at a master cylinder pressure conversion portion based on the braking input stroke Si that is the early signal. The estimated master cylinder pressure Pm#e is specified beforehand to have characteristics as illustrated in FIG. 18.

The jumping characteristics of the vacuum booster VB is considered in the calculation of the estimated master cylinder pressure. In this case, the estimated master cylinder pressure is specified to be zero (i.e., non-braking state) until the braking input stroke Si reaches a value Sij at which the jumping occurs. Then, the estimated master cylinder pressure is brought to a value Pm#j when the braking input stroke Si becomes equal to the value Sij. Accordingly, the pump assist matches the boosting operation of the vacuum booster VB.

Figure 19:
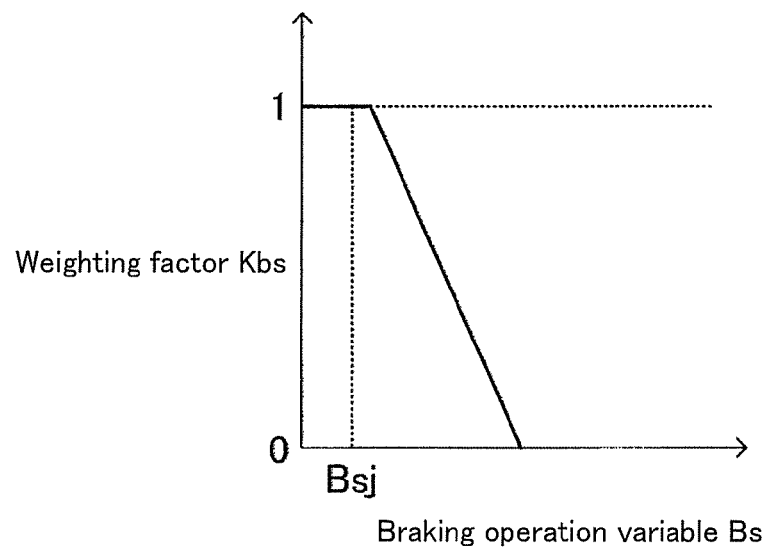
FIG. 19 is a graph illustrating a table specifying a relationship between the braking operation variable and a weighting factor.

The braking operation variable Bs is calculated according to an equation 1 below on the basis of the estimated master cylinder pressure Pm#e and an actual pressure (i.e., actual master cylinder pressure Pm#a) detected by the master cylinder pressure sensor PM#. In this case, Kbs is a weighting factor and is specified as illustrated in FIG. 19.

$$Bs=(1-Kbs)*Pm\#a+Kbs*Pm\#e \quad \text{(Equation 1)}$$

In an area in the vicinity of zero of the braking operation variable Bs, the actual master cylinder pressure Pm#a is not generated. Thus, the weighting factor for the estimated master cylinder pressure Pm#e is specified to be one. That is, the braking operation variable Bs is calculated only on the basis of the estimated master cylinder pressure Pm#e.

As mentioned above, the jumping characteristics of the vacuum booster VB is specified by the clearance C formed between the plunger PL and the reaction disc RD. Then, the weighting factor is specified to be one so that the braking operation variable Bs is calculated only on the basis of the estimated master cylinder pressure Pm#e in an area in the vicinity of zero of the braking operation variable Bs (i.e., at least including the value Bsj of the braking operation variable Bs at which the jumping is started). Accordingly, the pump assist is achieved to precisely match the jumping of the vacuum assist defined by the clearance C.

As explained above, the calculation method based on the brake input stroke Si (i.e., displacement of the brake pedal) is explained. The braking input stroke Si and the braking input force Fi have a predetermined relationship therebetween. Thus, the braking input stroke Si is displaceable by the braking input force Fi. In addition, the braking input stroke Si and the braking input force Fi may be both used.

[Compensation for Responsiveness of the Electric Motor Start-Up]

As mentioned above, the time delay in the total control system is an issue in the pump assist. In cases where the vacuum assist is switched to the pump assist in the middle of the braking operation or the pump assist is started while the negative assist is being performed according to the apparatuses disclosed in JP9030385A and JP9323641A, the pump assist is started after the certain braking operation has been already performed. Thus, the start-up of the electric motor can be prepared beforehand. On the other hand, according to the braking control apparatus of the present embodiment, the pump assist is started in a state where the braking operation variable is a minimum value including a zero value and thus a high start-up responsiveness of the electric motor is required.

Then, a brushless DC motor is applied to the electric motor M. In this case, a brushed DC motor includes a rotor equipped with coils and a stator equipped with permanent magnets. The rotor equipped with the coils has a large inertia moment, which is a disadvantage for the start-up of the electric motor. On the other hand, the brushless DC motor includes a rotor equipped with relatively light-weighted permanent magnets and a stator equipped with relatively heavy-weighted coils. Thus, the rotor has a small inertia moment that is an advantage for the start-up of the electric motor to thereby enhance the start-up responsiveness and therefore the initial responsiveness of the pump assist.

In addition, time is required for the electric motor to start from a state where the number of revolutions of the electric motor is zero (i.e., electric motor is stopped). Thus, the electric motor is desirably driven (i.e., rotated, at a rotation speed equal to or less than a value Np1, for example) even at a time of the non-braking operation. At this time, the pressure regulating means such as the linear solenoid valve controls in such a way that no pressure is generated in the hydraulic circuits. A low rotational speed such as a predetermined rotational speed Np1 or less of the electric motor is sufficient at the time of the non-braking operation since it is not necessary for the braking pressure to be generated.

The start-up responsiveness of the electric motor M is inefficient at a low temperature at which the viscosity of the braking fluid is high. Thus, the electric motor is brought to rotate even at the time of the non-braking operation when a detection result (i.e., temperature Tp) of a temperature sensor (not shown) is equal to a predetermined value Tp1 or less. At this time, the temperature sensor TP can be exclusively provided for the braking control apparatus or can be an ambient temperature sensor, a water temperature sensor, an oil temperature sensor, and the like previously provided at a vehicle.

In addition, the temperature increase is expected by the rotation of the electric motor M. Thus, the activation of the electric motor may be initiated from a start of the engine (i.e., from a point where an ignition is turned on), and then be terminated when a duration time of the activation of the electric motor reaches a predetermined time T1.

The driver operates or depresses an acceleration pedal (i.e., accelerating operation member) (not shown) at a constant speed driving of a vehicle in addition to an accelerated driving. Then, the driver starts operating or depressing the brake pedal BP when a deceleration of the vehicle is required. Thus, the activation of the electric motor can be started when the operation or depression of the acceleration pedal is terminated, i.e., the acceleration pedal is returned to an initial position where the pedal is not depressed (i.e., return operation of the accelerating operation member is performed) to thereby enhance the start-up responsiveness of the electric motor. In this case, an operating level or variable of the acceleration pedal AP by the driver (i.e., acceleration pedal operation variable As) is detected by an acceleration pedal sensor AS. In cases where the acceleration pedal operation variable As turns to zero (i.e., acceleration pedal is not operated or depressed) or a rate of change of the acceleration pedal operation variable As with respect to time (i.e., acceleration pedal operation speed dAs) corresponds to the returning direction of the acceleration pedal, the electric motor M is activated.

The high start-up responsiveness of the electric motor M is particularly required for a sudden braking in case of an emergency. At this time, the driver starts the braking operation after rapidly returning the acceleration pedal to the initial position. Thus, the electric motor M is started when the acceleration pedal operation speed dAs in the returning direction of the acceleration pedal operation exceeds a predetermined value dAs1.

The acceleration pedal operation variable and the engine throttle opening have a predetermined relationship therebetween. Thus, the acceleration pedal sensor AS can be replaced by the throttle position sensor TH. In this case, the acceleration pedal operation variable As is replaced by a throttle opening Th, and the acceleration pedal operating speed dAs is replaced by a throttle opening speed dTh.

Further, the activation of the electric motor M may be only performed within a predetermined time T2 from the engine start (i.e., when the ignition is turned on).

[Pump Assist Range and Vacuum Assist Range]

Figure 20:
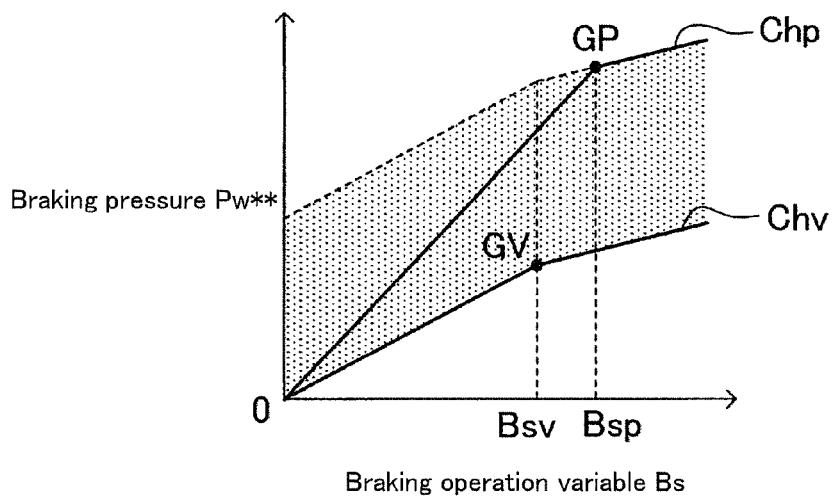
FIG. 20 is a graph illustrating increase characteristics of the braking pressure relative to the braking operation variable in cases where the braking operation variable at a time of a pump assist limit point is specified to be greater than the braking operation variable at a time of a vacuum assist limit point.
Figure 21:
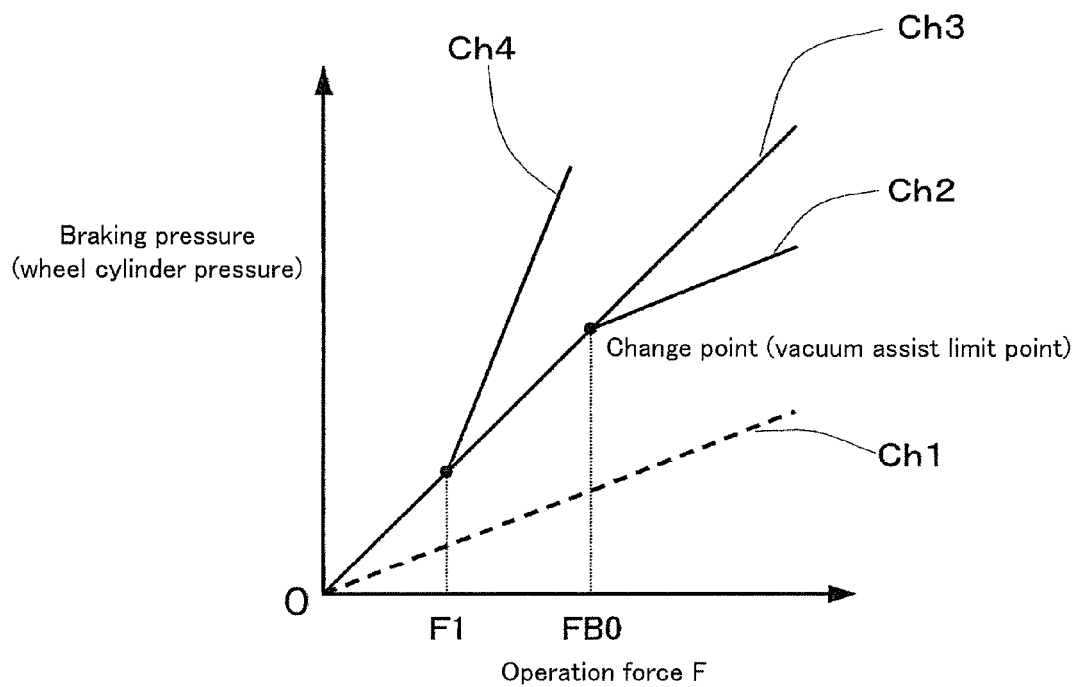
FIG. 21 is a graph illustrating characteristics of the braking pressure (i.e., wheel cylinder pressure) relative to a braking operation according to a conventional braking control apparatus for a vehicle.

As illustrated in FIG. 20, a value Bsp of the braking operation variable Bs corresponding to a pump assist limit point GP can be specified larger than a value Bsv of the braking operation variable Bs corresponding to a vacuum assist limit point GV. In FIG. 20, a characteristic line Chv shows characteristics in cases where only the vacuum assist is performed. A characteristic line Chp shows characteristics in cases where the pump assist in addition to the vacuum assist is performed. A broken line shows characteristics of the pump assist limit (i.e., maximum value of the assist pressure) specified on the basis of the output limit of the pump and the electric motor.

That is, the characteristics of the pump assist relative to the braking operation variable Bs is specified in such a way that a range of the vacuum assist (i.e., a range of the braking operation variable Bs from zero or the value Bsj at which the jumping of the vacuum booster is started to the value Bsv at which the vacuum assist limit point GV is obtained) is included in a range of the pump assist (i.e., a range of the braking operation variable Bs from equal to or smaller than the predetermined value at which the vacuum assist is started to the value Bsp at which the pump assist limit point GP is obtained).

The characteristics of the vacuum assist are mechanically determined. On the other hand, the characteristics of the pump assist are adjustable by means of the electronic control. Thus, a brake pedal feeling of the driver may be easily controlled by means of the pump assist. The value Bsp is specified larger than the value Bsv as mentioned above so that the increase characteristics of the braking pressure relative to the increase of the braking operation variable can be maintained at a desired level until the braking operation variable Bs reaches the value Bsp even when the braking operation variable Bs exceeds the value Bsv.

In a state where the vacuum booster has the jumping characteristics, the assist force increases in a stepwise manner from zero because of the jumping characteristics of the vacuum booster VB when the braking operation variable is equal to the predetermined value (i.e., minimal value) at which the assist force is started by the vacuum booster VB.

Accordingly, the assist hydraulic pressure is adjusted to be greater than zero over the range where the braking operation variable is greater than the predetermined value (for example, value at which the jumping occurs) at which the assist force of the vacuum booster is started. That is, the vacuum assist and the pump assist are started substantially at the same time in a state where the braking operation force is sufficiently small (including a state where the braking operation force is zero) immediately after the start of the braking operation.

Thus, the pump assist is prevented from starting during the braking operation having the sufficiently large braking operation force with the vacuum assist. Consequently, the driver may be prevented from having an uncomfortable feeling in the braking operation caused by the combination of the vacuum assist and the pump assist having different operating principles from each other.

According to the aforementioned embodiment, the vacuum assist and the pump assist are started substantially at the same time while the braking operation is sufficiently small (including a state where the braking operation force is zero) immediately after the start of the braking operation. Thus, the driver is prevented from having the uncomfortable feeling in the braking operation. In addition, the increase characteristics of the braking hydraulic pressure relative to the increase of the braking operation variable Bs may be maintained to be desired characteristics until the braking operation variable Bs reaches the assist limit point GP of the pump assist even after the braking operation variable Bs exceeds the assist limit point GV of the vacuum assist.

Further, the vacuum booster VB includes jumping characteristics by which the assist force increases in a stepwise manner from zero in a case where the braking operation variable Bs reaches the predetermined value, and the target value determining means determines the assist hydraulic pressure target value SP#t to be maintained at zero in a case where the braking operation variable Bs is equal to or smaller than the predetermined value and to increase from zero in response to an increase of the braking operation variable Bs from the predetermined value.

As explained above, the vacuum assist and the pump assist are started simultaneously at a time of the jumping start immediately after the braking operation start (i.e., braking operation force is sufficiently small) provided that the vacuum booster has the jumping characteristics. Thus, the driver is further prevented from having the uncomfortable feeling in the braking operation caused by the combination of the vacuum assist and the pump assist having the different operating principles from each other.

Furthermore, the vacuum booster includes jumping characteristics by which the assist force increases in a stepwise manner from zero in a case where the braking operation variable reaches the predetermined value, and the target value determining means determines the assist hydraulic pressure target value SP#t to be maintained at zero in a case where the braking operation variable Bs is equal to or smaller than the predetermined value and to increase from a value greater than zero in response to an increase of the braking operation variable Bs from the predetermined value.

Thus, the increase of the braking operation in a stepwise manner at the time of the jumping start may be ensured to thereby enhance the effect of the increase of the braking force by the jumping characteristics of the vacuum booster VB.

Furthermore, the detecting means BS obtain an operation variable detection value corresponding to one of a displacement of the braking operation member BP or OR operated by the driver and an operation force of the braking operation member BP or OR, and detect the braking operation variable Bs based on the obtained operation variable detection value.

In this case, the detecting means BS detect an actual value of the hydraulic pressure generated by the master cylinder MC and calculate an estimation value of the hydraulic pressure generated by the master cylinder MC based on the operation variable detection value so as to detect the braking operation variable Bs based on the actual value and the estimation value of the hydraulic pressure generated by the master cylinder MC.

Since the objective of the braking control is the braking hydraulic pressure, it is assumed that the master cylinder pressure of the same physical quantity (dimensions) as the braking hydraulic pressure is desirably used as the braking operation variable Bs. The actual value of the master cylinder pressure includes a relatively large response delay to the braking operation of the driver resulting from a response delay that is inevitably present in a transmission system from the braking operation member BP to the master cylinder MC. On the other hand, the operation variable detection value includes an extremely small response delay relative to the braking operation of the driver. Thus, the estimation value of the master cylinder pressure calculated on the basis of the operation variable detection value may have extremely small response delay relative to the braking operation of the driver. Consequently, as mentioned above, the detection of the braking operation variable Bs based on the actual value in addition to the estimation value of the master cylinder pressure may enhance the responsiveness of the braking operation variable Bs and therefore the responsiveness of the pump assist relative to the braking operation of the driver.

Furthermore, the motor M and the pump PH# are driven in a case where the braking operation member BP or OR is not operated by the driver.

According to the braking control apparatus of the present embodiment, the pump assist is started immediately after the start of the braking operation. In this case, according to a possible structure of the braking control apparatus in which the motor that drives the pump is driven in association with the start of the braking operation, the initial responsiveness of the pump assist immediately after the start of the braking operation may not be ensured resulting from the responsiveness of the start-up of the motor.

In response to the above, the motor M and the pump PH# are driven in cases where the braking operation member BP is not operated, i.e., before the start of the braking operation so that the initial responsiveness of the pump assist immediately after the braking operation may be appropriately ensured.

A driving of the motor M and the pump PH# are started in a case where the braking operation member BP is not operated by the driver and an accelerating operation member is operated by the driver to be returned to its initial position where the accelerating operation member is not depressed.

In order to ensure the initial responsiveness of the pump assist, the driving of the motor M and the pump PH# may be started only short time before the start of the braking operation while the braking operation member BP is not operated. In this case, the driver generally starts the braking operation after returning the accelerating operation member to its initial point. That is, the returning operation of the accelerating operation member is performed relatively short time before the start of the braking operation. Thus, according to the present embodiment, the driving of the motor M and the pump PH# in a case where the braking operation member BP is not operated is prevented from starting in an unnecessarily early stage.

In addition, a driving of the motor M and the pump PH# are started at a time of the engine start while the braking operation member BP is not operated and is prohibited after a duration time of the driving of the motor M and the pump PH# reaches a predetermined time T1.

The responsiveness of the start-up of the motor M particularly decreases at a low temperature of the brake hydraulic circuit where the viscosity of fluid (i.e., brake fluid) for generating the braking hydraulic pressure is high. That is, after the temperature of the brake hydraulic circuit sufficiently increases, the necessity of driving the motor M and the pump PH# while the braking operation member BP is not operated is small. The temperature of the brake hydraulic circuit may sufficiently increase by the driving of the motor M for a predetermined time from the engine start of the vehicle. Thus, according to the present embodiment, the driving of the motor M and the pump PH# is prevented after the temperature of the brake hydraulic circuit sufficiently increases and therefore the responsiveness of the start-up of the motor M is easily ensured during the non-operation of the braking operation member BP.

The target value determining means include vehicle weight detecting means for calculating a gross weight of the vehicle and modifies the assist hydraulic pressure target value SP#t determined by the target value determining means based on the calculated gross weight of the vehicle.

Generally, the increase characteristics of the vehicle relative to the braking operation variable Bs are desirably constant. Thus, the increase characteristics of the braking pressure (i.e., wheel cylinder pressure) relative to the braking operation variable Bs is desirably basically constant.

However, even when the braking pressure is constant, the deceleration of the vehicle may decrease in cases where a gross weight of the vehicle increases because of an increase of loading weight of the vehicle. That is, even when the increase characteristics of the braking pressure relative to the braking operation variable Bs are constant, the increase characteristics of the deceleration of the vehicle relative to the braking operation variable Bs may change because of the change in gross weight of the vehicle.

In response to the above, the assist force by the pump assist can increase in response to the increase of gross weight of the vehicle. Consequently, the increase characteristics of the deceleration of the vehicle relative to the braking operation variable may be constant even at a time of the change of the gross weight of the vehicle.

The target value determining means include negative pressure detecting means for obtaining a negative pressure supplied to the vacuum booster VB and modifies the assist hydraulic pressure target value SP#t determined by the target value determining means based on the obtained negative pressure.

In cases where the negative pressure supplied to the vacuum booster VB decreases (i.e., the negative pressure changes towards the atmospheric pressure), the assist force by means of the vacuum assist decreases. That is, the change of the negative pressure supplied to the vacuum booster VB may cause the change of the increase characteristics of the braking pressure relative to the braking operation variable Bs.

On the other hand, according to the present embodiment, the assist force (assist hydraulic pressure) by means of the pump assist may increase in response to the decrease in the negative pressure supplied to the vacuum booster VB. As a result, even when the negative pressure supplied to the vacuum booster VB changes, the increase characteristics of the deceleration of the vehicle relative to the braking operation variable Bs may be constant.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

The invention claimed is:

1. A braking control apparatus for a vehicle, comprising:
   four wheel braking apparatuses for applying a braking torque to front-right, front-left, rear-right, and rear-left wheels in response to a braking hydraulic pressure supplied to wheel cylinders provided at the respective wheels;
   a first hydraulic pressure generating apparatus including two hydraulic pressure generating chambers each generating a hydraulic pressure in response to a braking operation by a driver of a vehicle;
   a vacuum booster generating an assist force for assisting a breaking operation performed by the driver relative to the first hydraulic pressure generating apparatus;
   a first hydraulic circuit hydraulically connecting one of the hydraulic pressure generating chambers to the two of the wheel braking apparatuses;
   a second hydraulic circuit hydraulically connecting the other one of the hydraulic pressure generating chambers to the other two of the wheel braking apparatuses;
   a second hydraulic pressure generating apparatus being power driven and generating an assist hydraulic pressure that is added to the hydraulic pressure in each of the first hydraulic circuit and the second hydraulic circuit generated by the first hydraulic pressure generating apparatus;
   detecting means for detecting a braking operation variable in response to the braking operation;
   target value determining means for determining, on the basis of the detected braking operation variable, a first assist hydraulic pressure target value in the first hydraulic circuit and a second assist hydraulic pressure target value in the second hydraulic circuit to be both greater than zero over a range where the braking operation variable is greater than a predetermined value at which the assist force by the vacuum booster is started; and
   pressure regulating means for regulating the assist hydraulic pressure in each of the first hydraulic circuit and the second hydraulic circuit to mach each of the first assist hydraulic pressure target value and the second assist hydraulic pressure target value determined by the target value determining means.

2. A braking control apparatus according to claim 1, wherein the vacuum booster includes jumping characteristics by which the assist force increases in a stepwise manner from zero in a case where the braking operation variable reaches the predetermined value, and the target value determining means determines each of the first and second assist hydraulic pressure target values to be maintained at zero in a case where the braking operation variable is equal to or smaller than the predetermined value and to increase from zero in response to an increase of the braking operation variable from the predetermined value.

3. A braking control apparatus according to claim 1, wherein the vacuum booster includes jumping characteristics by which the assist force increases in a stepwise manner from zero in a case where the braking operation variable reaches the predetermined value, and the target value determining means determines each of the first and second assist hydraulic pressure target values to be maintained at zero in a case where the braking operation variable is equal to or smaller than the predetermined value and to increase from a value greater than zero in response to an increase of the braking operation variable from the predetermined value.

4. A braking control apparatus according to claim 1, wherein the detecting means obtain an operation variable detection value corresponding to one of a displacement of a braking operation member operated by the driver and an operation force of the braking operation member and detect the braking operation variable based on the obtained operation variable detection value.

5. A braking control apparatus according to claim 4, wherein the detecting means detect an actual value of the hydraulic pressure generated by the first hydraulic pressure generating apparatus and calculate an estimation value of the hydraulic pressure generated by the first hydraulic pressure generating apparatus based on the operation variable detection value so as to detect the braking operation variable based on the actual value and the estimation value of the hydraulic pressure generated by the first hydraulic pressure generating apparatus.

6. A braking control apparatus according to claim 1, wherein the second hydraulic pressure generating apparatus is driven in a case where a braking operation member is not operated by the driver.

7. A braking control apparatus according to claim 6, wherein a driving of the second hydraulic pressure generating apparatus is started in a case where the braking operation member is not operated by the driver and an accelerating operation member is operated by the driver to be returned to its initial position where the accelerating operation member is not depressed.

8. A braking control apparatus according to claim 6, wherein a driving of the second hydraulic pressure generating apparatus is started at a time of an engine start while the braking operation member is not operated and is prohibited after a duration time of the driving of the second hydraulic pressure generating apparatus reaches a predetermined time.

9. A braking control apparatus according to claim 1, wherein the target value determining means include vehicle weight detecting means for calculating a gross weight of the vehicle and modifies each of the first and second assist hydraulic pressure target values determined by the target value determining means based on the calculated gross weight of the vehicle.

10. A braking control apparatus according to claim 1, wherein the target value determining means include negative pressure detecting means for obtaining a negative pressure supplied to the vacuum booster and modifies each of the first and second assist hydraulic pressure target values determined by the target value determining means based on the obtained negative pressure.

* * * * *